US011258994B2

(12) United States Patent
Tanaka et al.

(10) Patent No.: US 11,258,994 B2
(45) Date of Patent: Feb. 22, 2022

(54) PHASE MODULATOR, LIGHTING SYSTEM, AND PROJECTOR

(71) Applicants: SONY CORPORATION, Tokyo (JP); SONY SEMICONDUCTOR SOLUTIONS CORPORATION, Kanagawa (JP)

(72) Inventors: Masa Tanaka, Kanagawa (JP); Takahiro Mochizuki, Kanagawa (JP); Osamu Akimoto, Tokyo (JP); Masahiro Ueshima, Kanagawa (JP); Toshihiko Mochida, Kagoshima (JP); Toshihiko Orii, Kanagawa (JP); Takayuki Ishida, Kanagawa (JP)

(73) Assignees: Sony Corporation, Tokyo (JP); Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/635,732

(22) PCT Filed: Jul. 19, 2018

(86) PCT No.: PCT/JP2018/027115
§ 371 (c)(1),
(2) Date: Jan. 31, 2020

(87) PCT Pub. No.: WO2019/031187
PCT Pub. Date: Feb. 14, 2019

(65) Prior Publication Data
US 2021/0136335 A1    May 6, 2021

(30) Foreign Application Priority Data

Aug. 7, 2017   (JP) .............................. JP2017-152623

(51) Int. Cl.
*H04N 9/31*   (2006.01)

(52) U.S. Cl.
CPC ......... *H04N 9/3155* (2013.01); *H04N 9/3105* (2013.01)

(58) Field of Classification Search
CPC .................................................... H04N 9/3155
See application file for complete search history.

(56) References Cited

U.S. PATENT DOCUMENTS

2007/0183019 A1    8/2007  Suh et al.
2008/0252977 A1*  10/2008  Iwamoto ................. G06E 3/003
                                                                       359/559

(Continued)

FOREIGN PATENT DOCUMENTS

JP     H05-66377      3/1993
JP     2009-524845    7/2009

(Continued)

OTHER PUBLICATIONS

International Search Report prepared by the Japan Patent Office dated Oct. 3, 2018, for International Application No. PCT/JP2018/027115.

*Primary Examiner* — John W Miller
*Assistant Examiner* — Justin B Sanders
(74) *Attorney, Agent, or Firm* — Sheridan Ross P.C.

(57) ABSTRACT

An object of the present disclosure is to provide a phase modulator, a lighting system, and a projector that allow for improving diffraction efficiency in a light phase modulation element. The phase modulator according to the present disclosure includes a light phase modulation element that has a plurality of pixels arranged with the pixel pitches p being different from each other to have a pixel structure suppressing occurrence of high-order diffraction light and that modulates a phase of light with respect to each of the pixels. Moreover, the phase modulator according to the present disclosure includes a capturing optical system that (Continued)

captures a plurality of fluxes of high-order diffraction light generated in each of the pixels.

20 Claims, 23 Drawing Sheets

(56) References Cited

U.S. PATENT DOCUMENTS

| | | | |
|---|---|---|---|
| 2009/0207466 A1* | 8/2009 | Bucklay | H04N 5/7441 |
| | | | 359/9 |
| 2009/0303597 A1 | 12/2009 | Miyawaki et al. | |
| 2014/0009731 A1* | 1/2014 | O'Callaghan | G02F 1/136277 |
| | | | 349/114 |
| 2018/0039072 A1 | 2/2018 | Okumura | |

FOREIGN PATENT DOCUMENTS

| | | |
|---|---|---|
| JP | 2009-294509 | 12/2009 |
| JP | 2011-507022 | 3/2011 |
| JP | 2014-206710 | 10/2014 |
| JP | 2015-099323 | 5/2015 |
| JP | 2016-099390 | 5/2016 |
| JP | 2016-114854 | 6/2016 |
| WO | WO 2016/129279 | 8/2016 |

\* cited by examiner

[ FIG. 1 ]
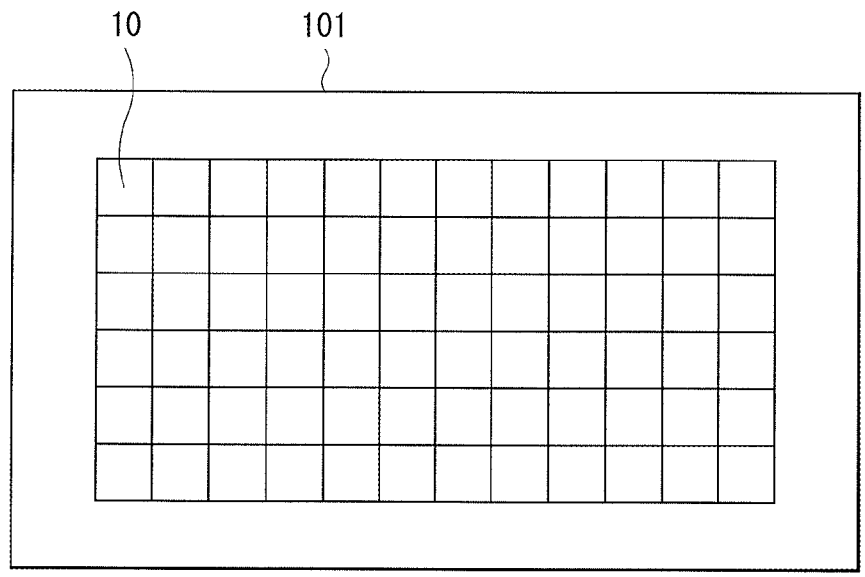
[ FIG. 2 ]
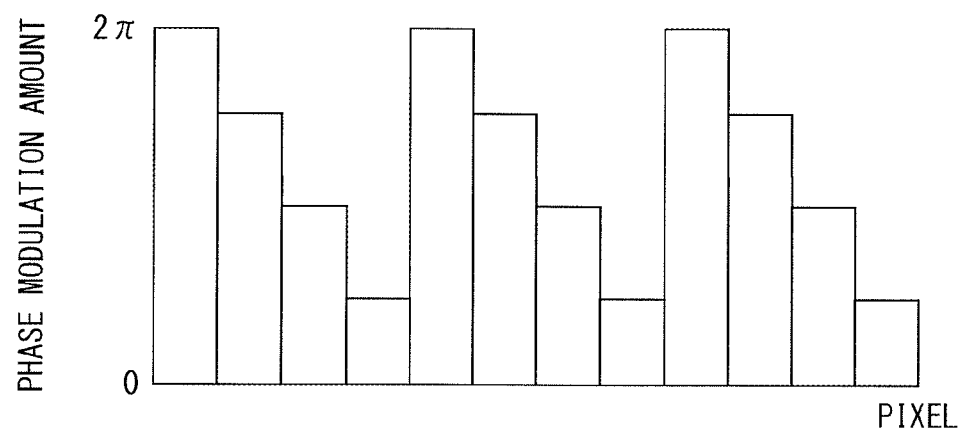

[ FIG. 3 ]
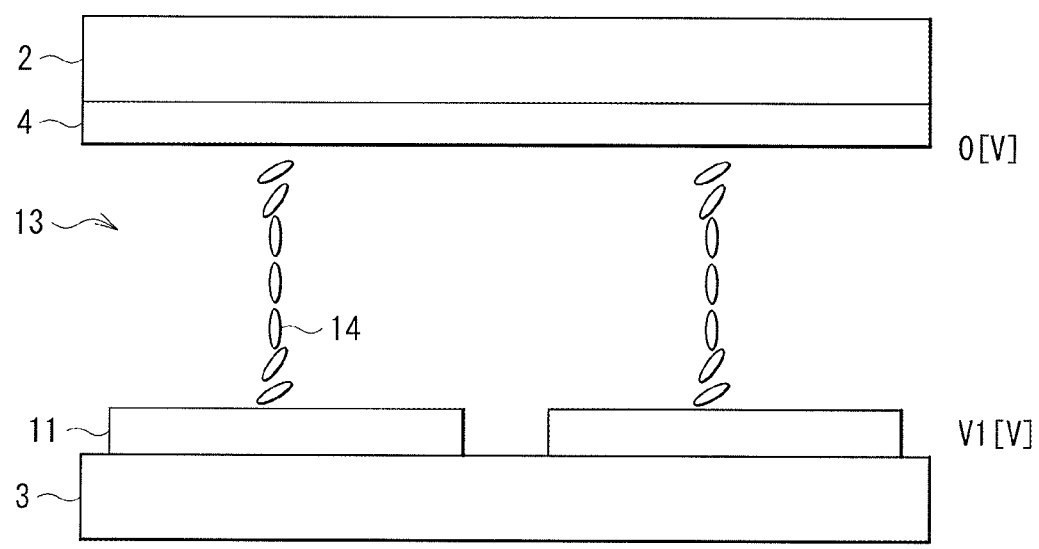

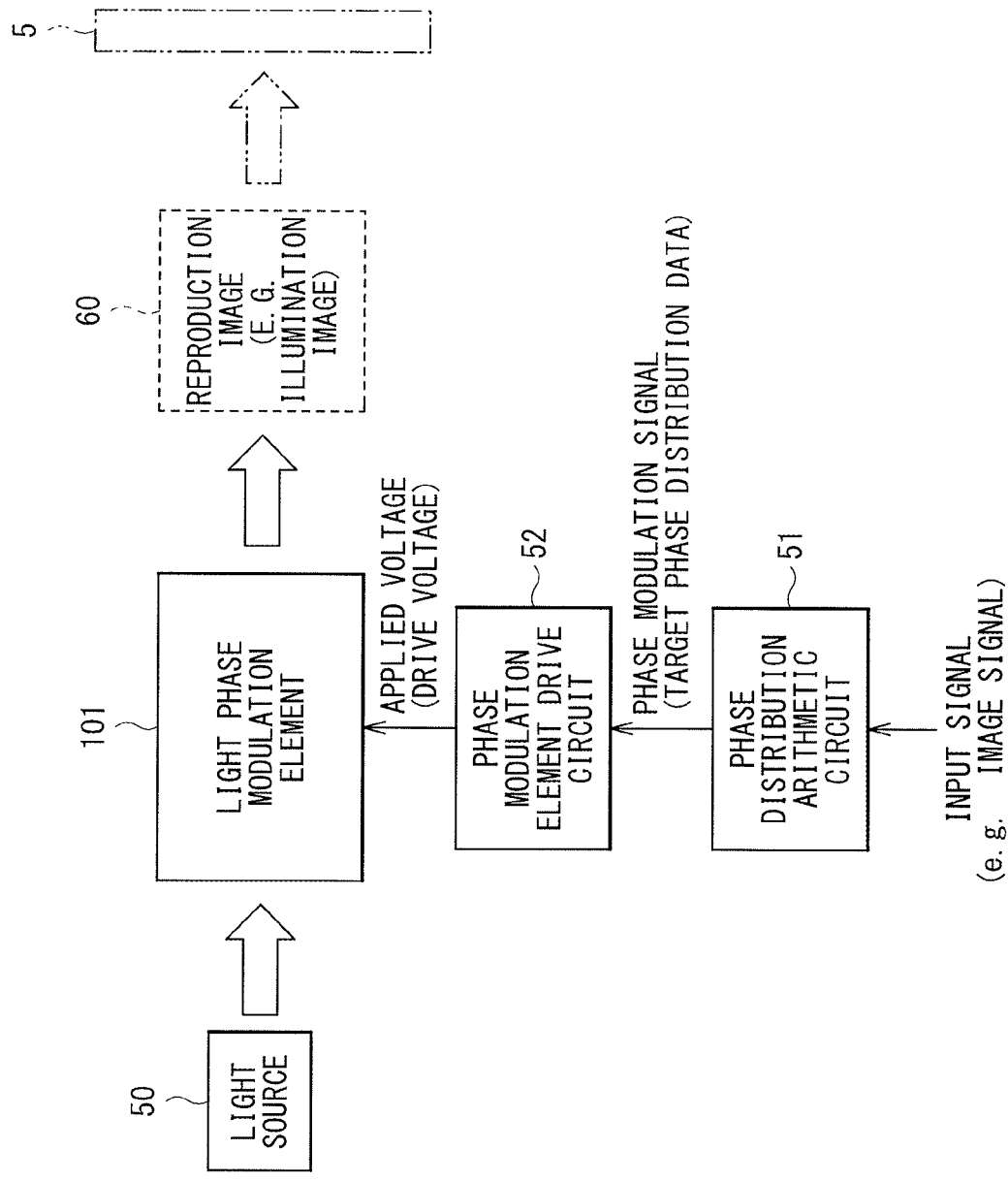
[FIG. 4]

[ FIG. 5 ]
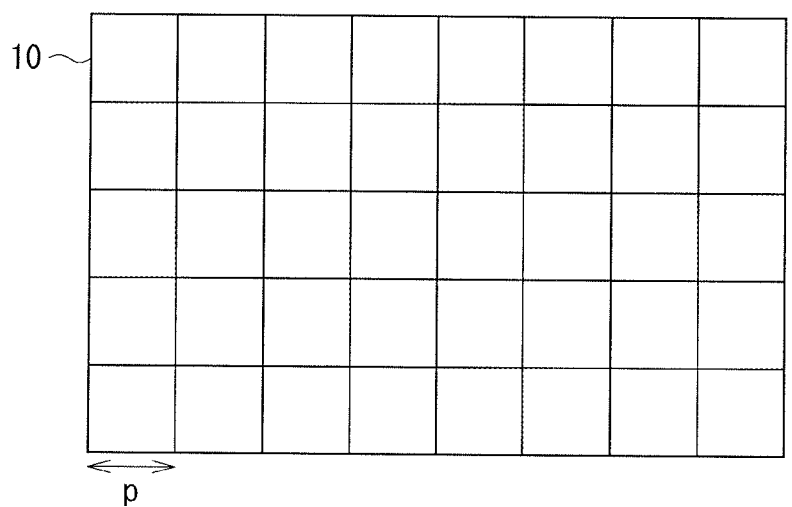
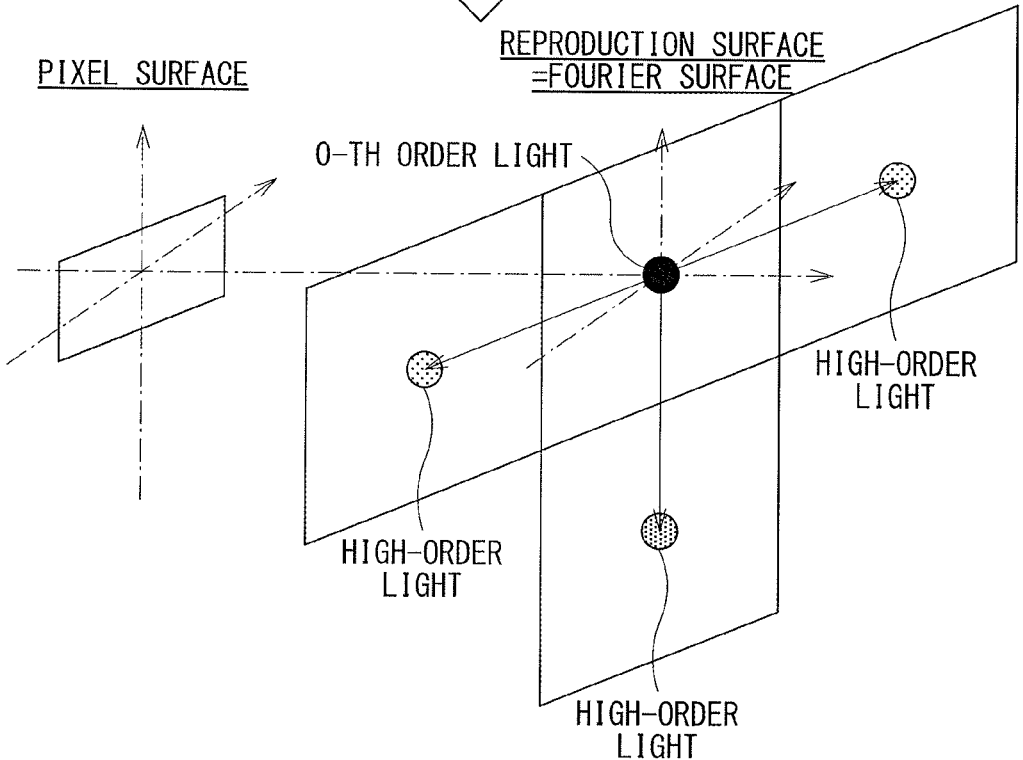

[ FIG. 6 ]
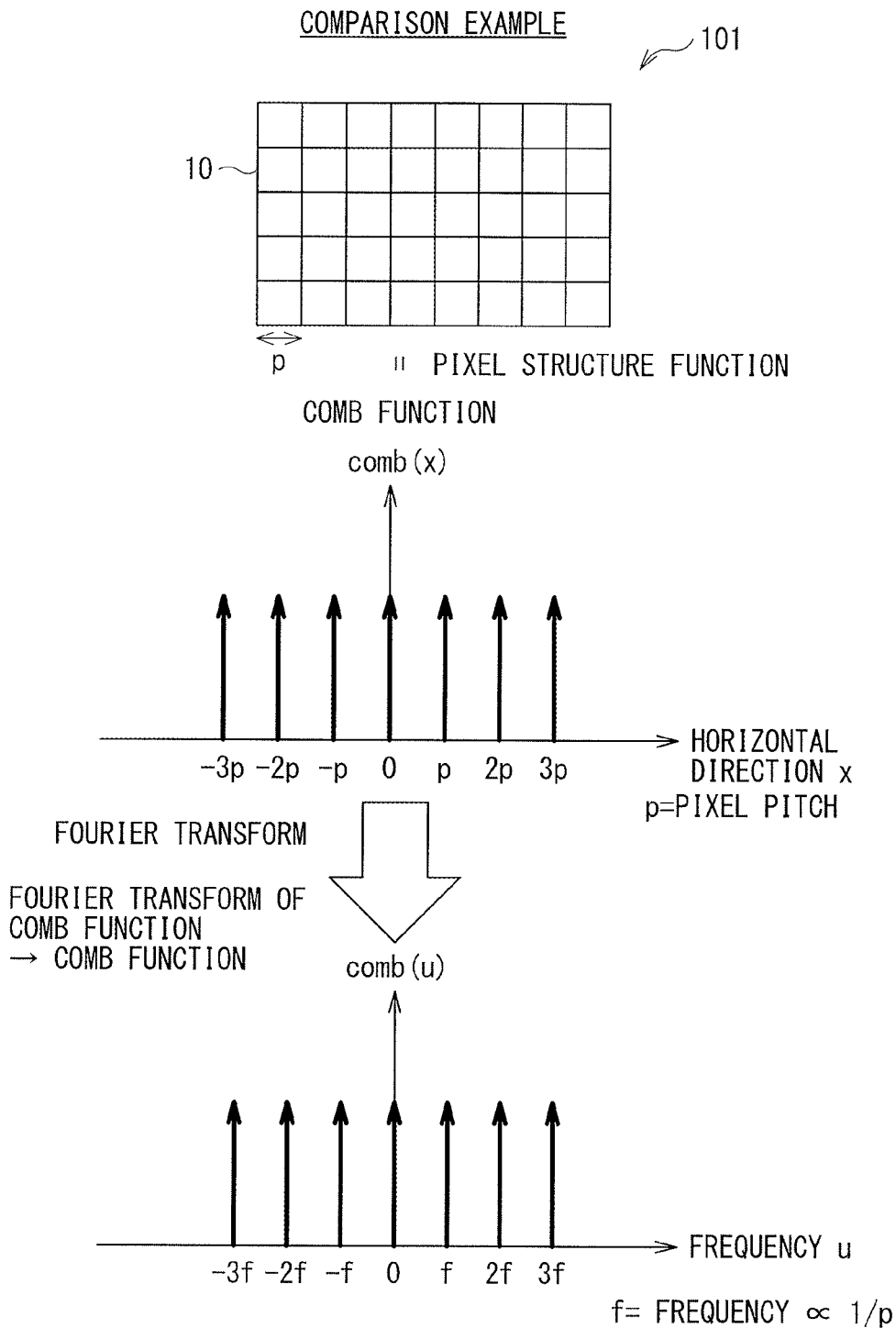

[FIG. 7]
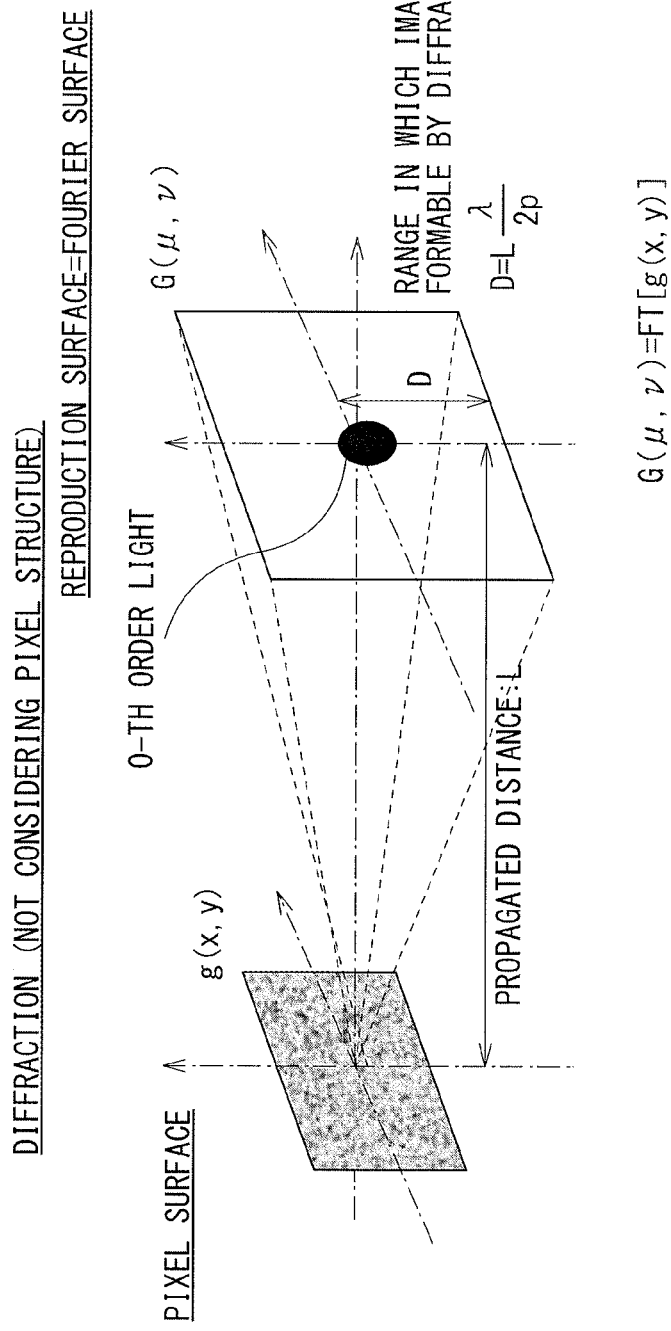

[FIG. 8]
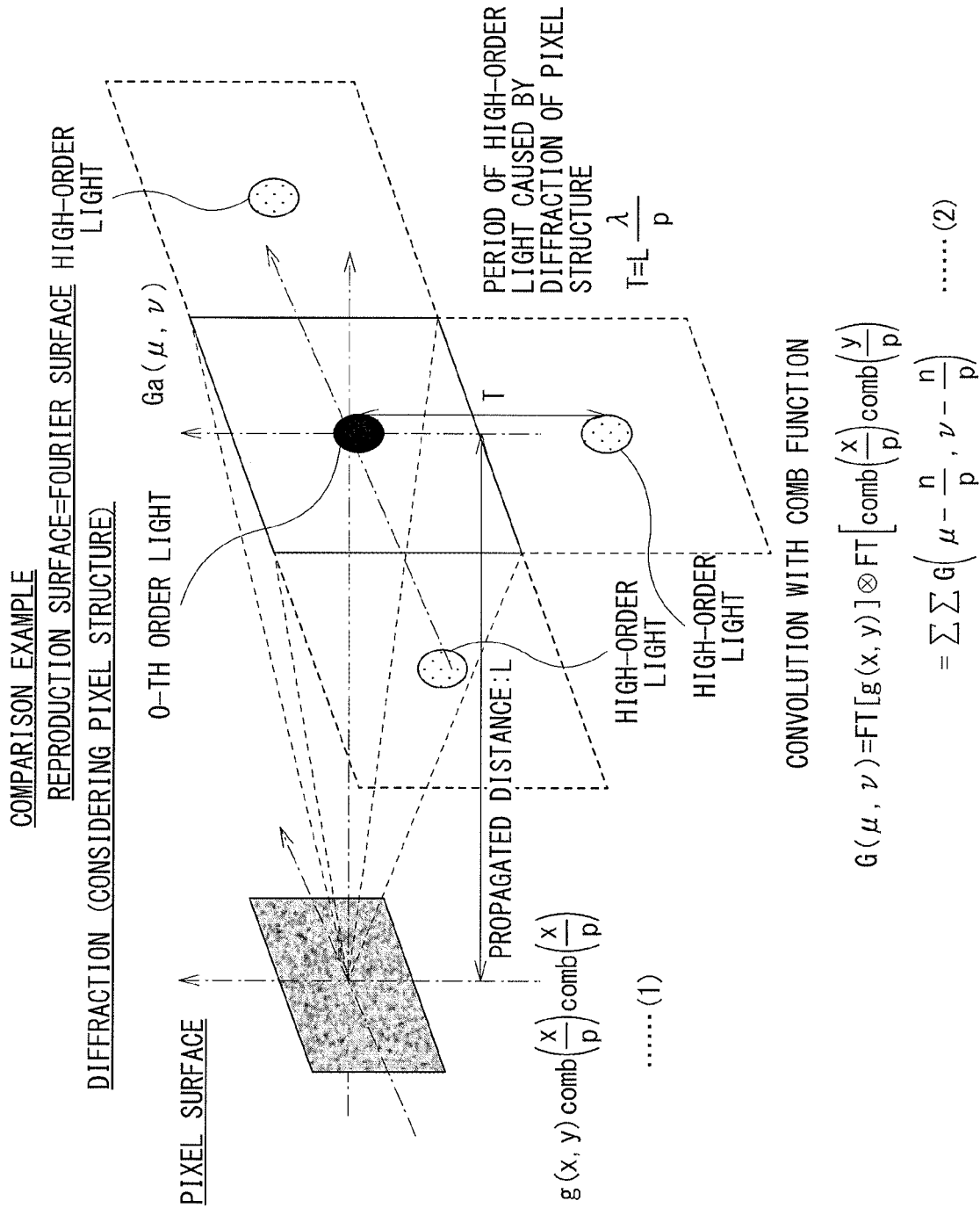

[ FIG. 9 ]
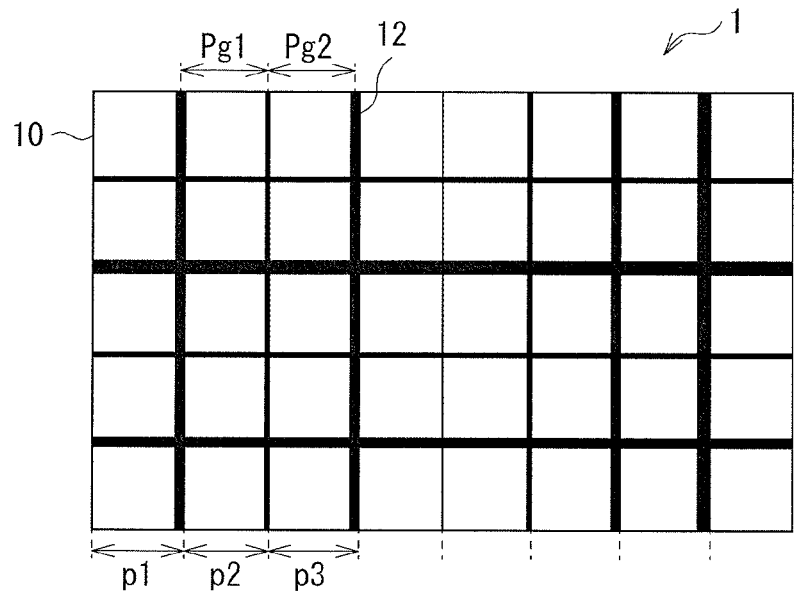
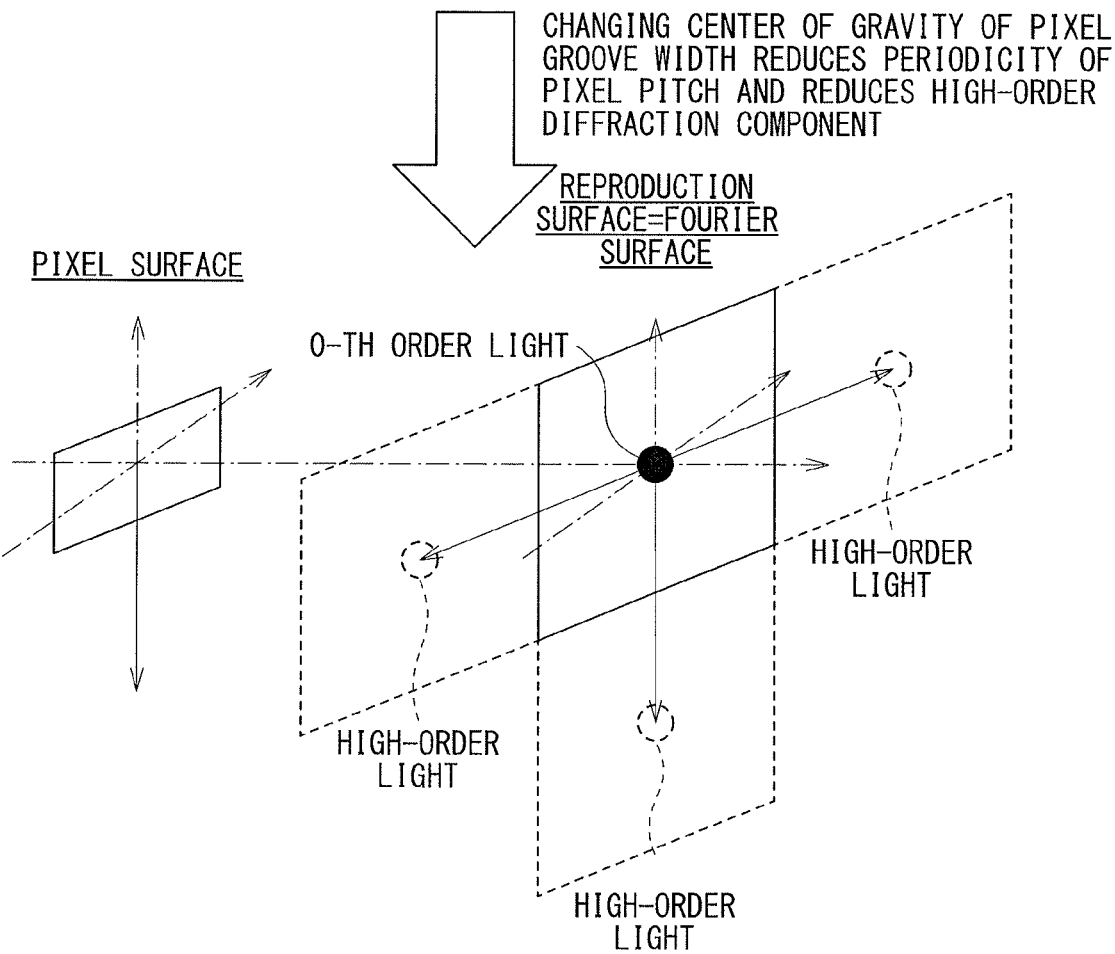
CHANGING CENTER OF GRAVITY OF PIXEL GROOVE WIDTH REDUCES PERIODICITY OF PIXEL PITCH AND REDUCES HIGH-ORDER DIFFRACTION COMPONENT

[ FIG. 10 ]
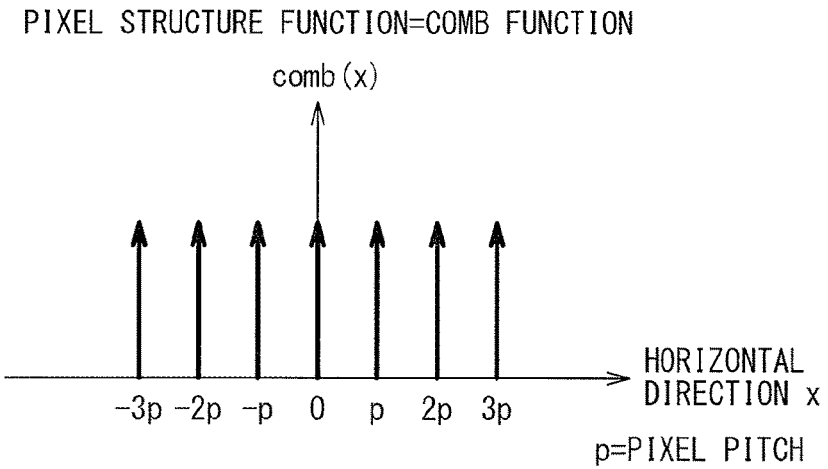
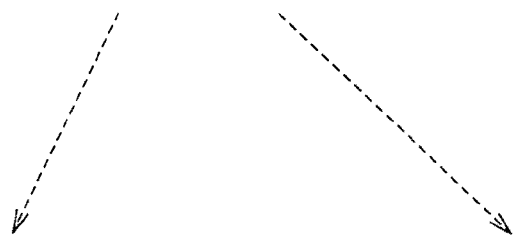
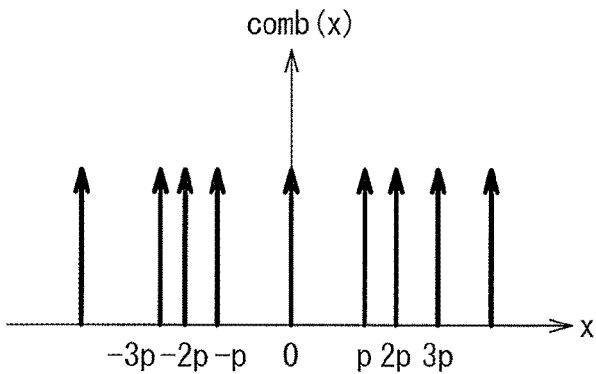
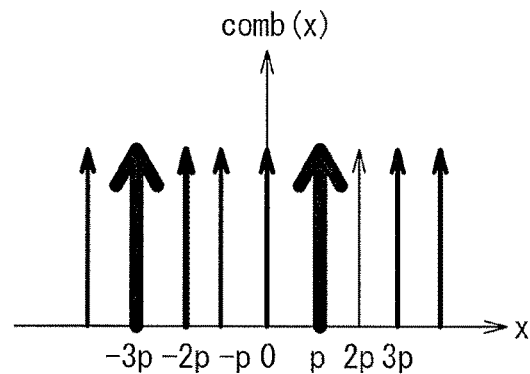

[ FIG. 11 ]
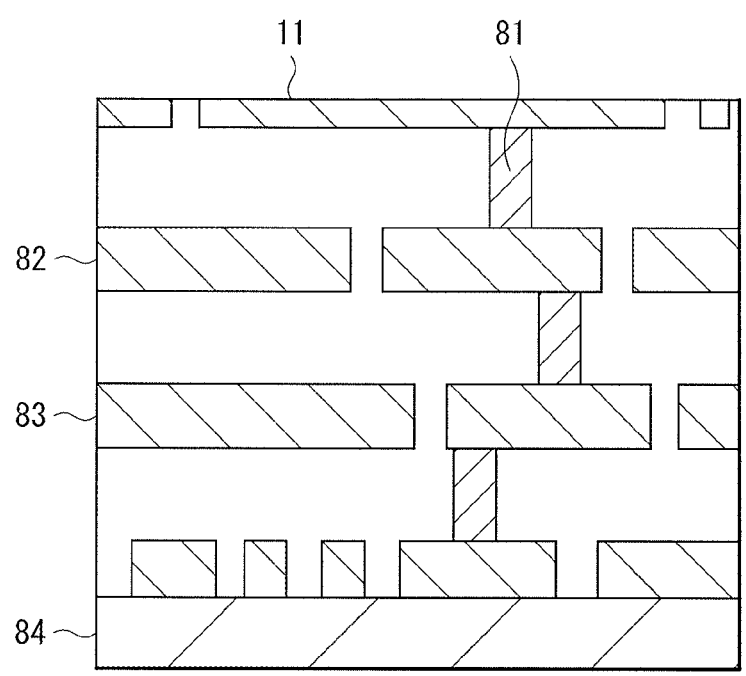

[ FIG. 12 ]
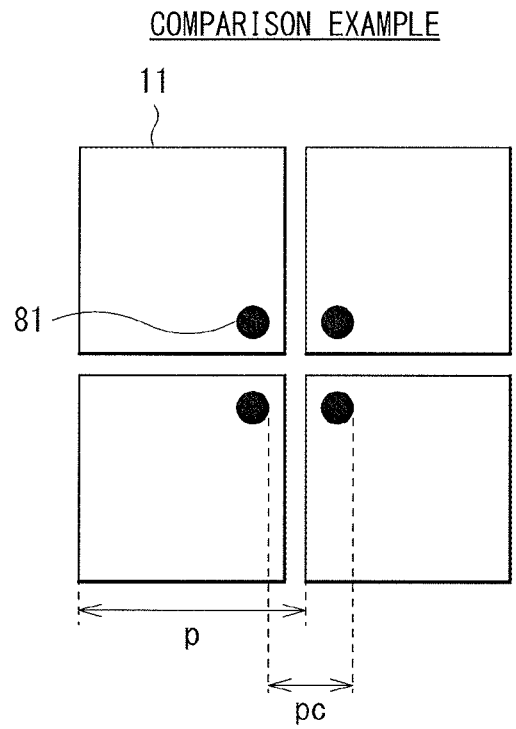
[ FIG. 13 ]
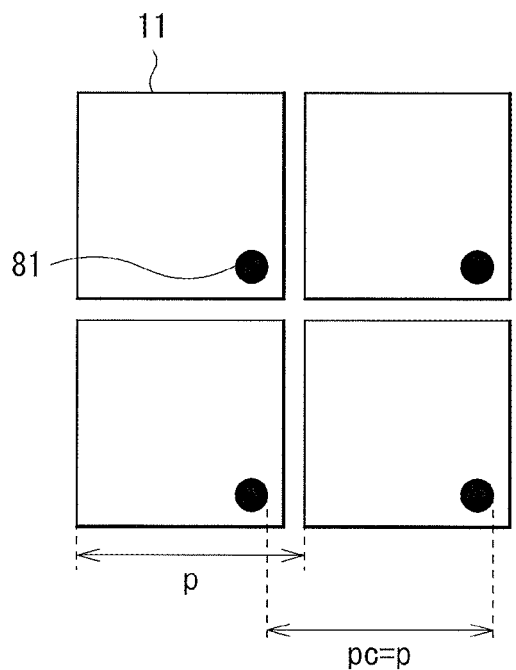

[ FIG. 14 ]
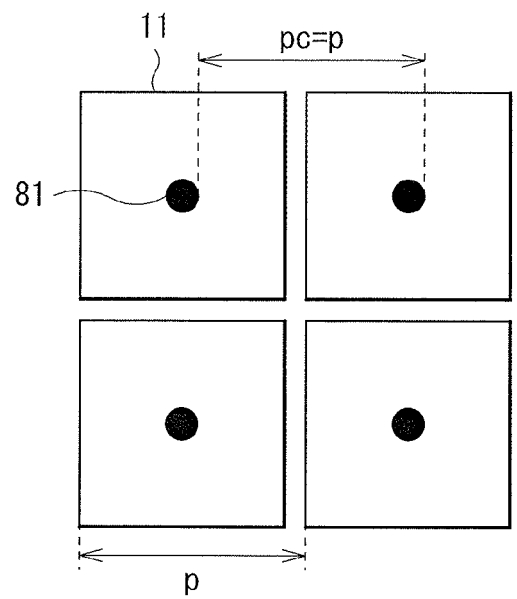
[ FIG. 15 ]
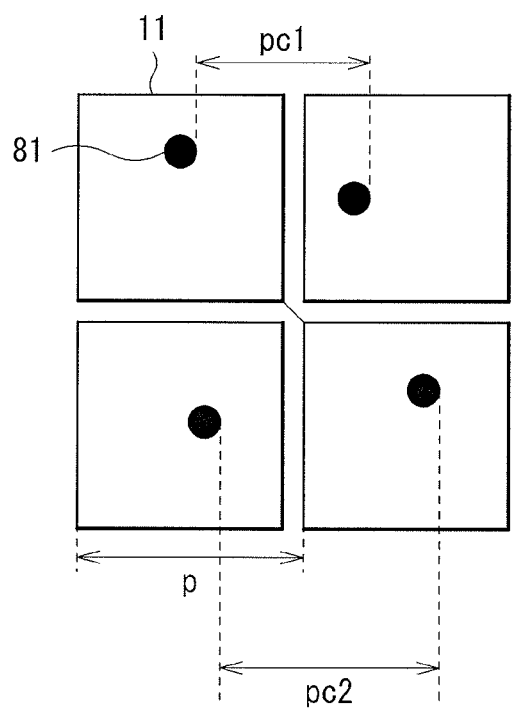

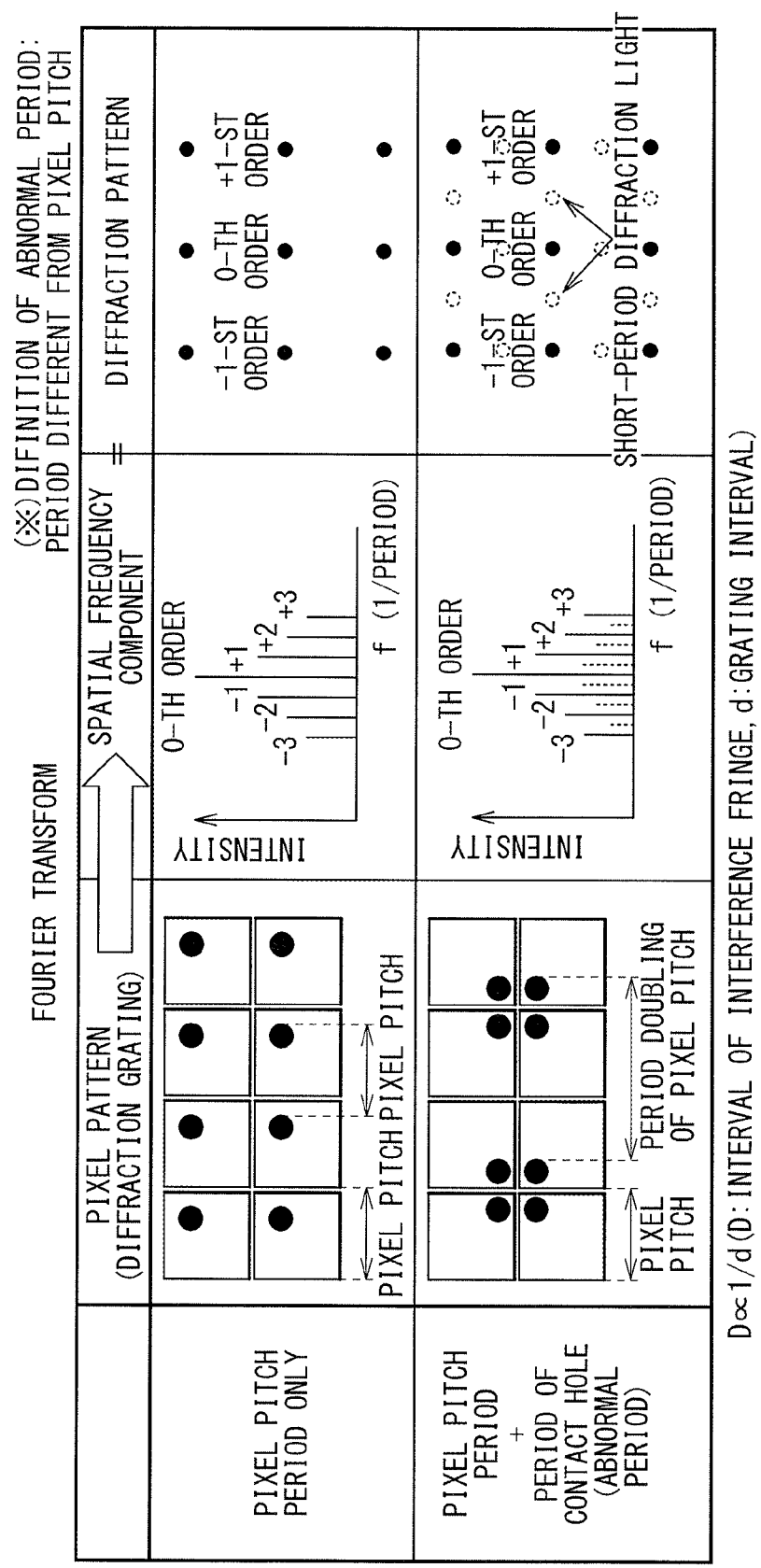

[ FIG. 17 ]
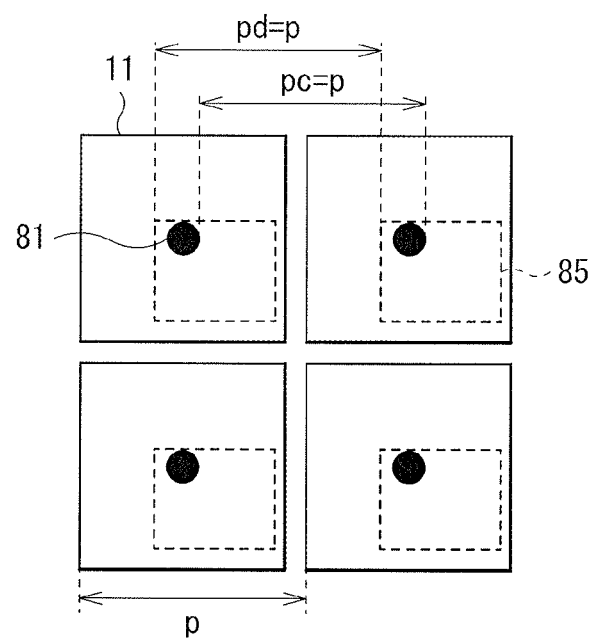

[ FIG. 18 ]
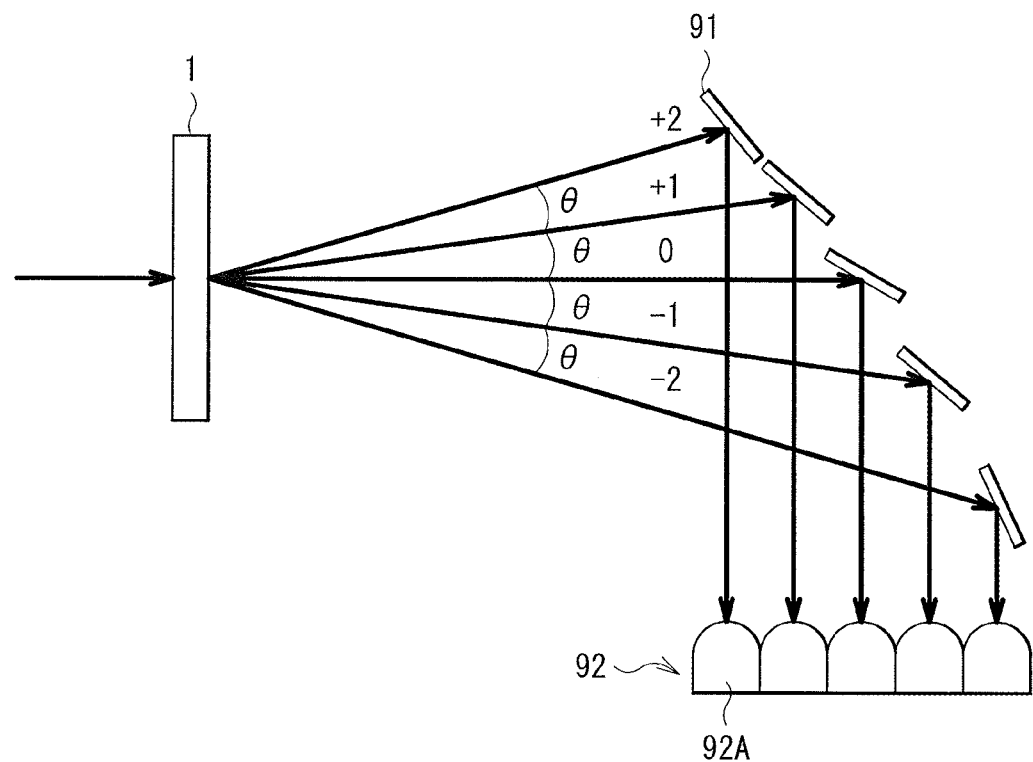
[ FIG. 19 ]
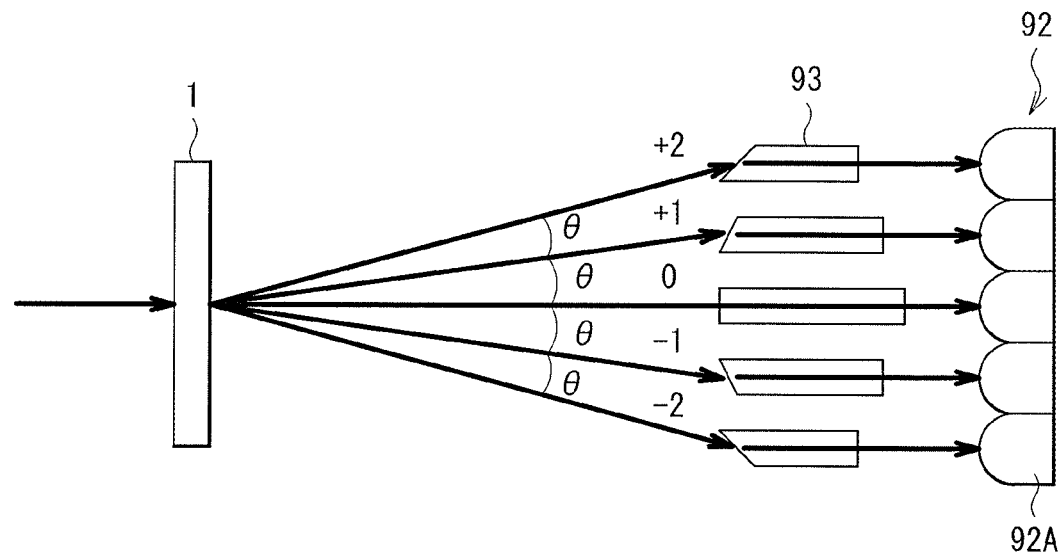

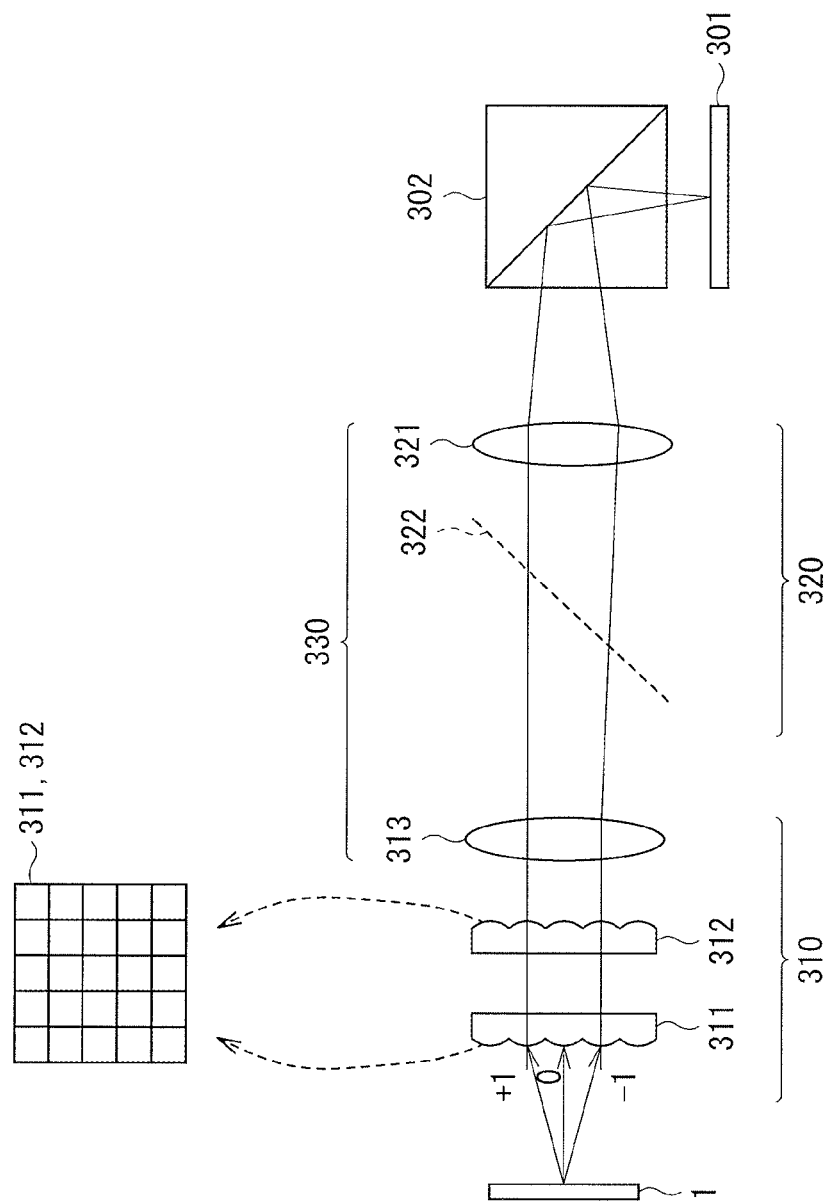
[FIG. 20]

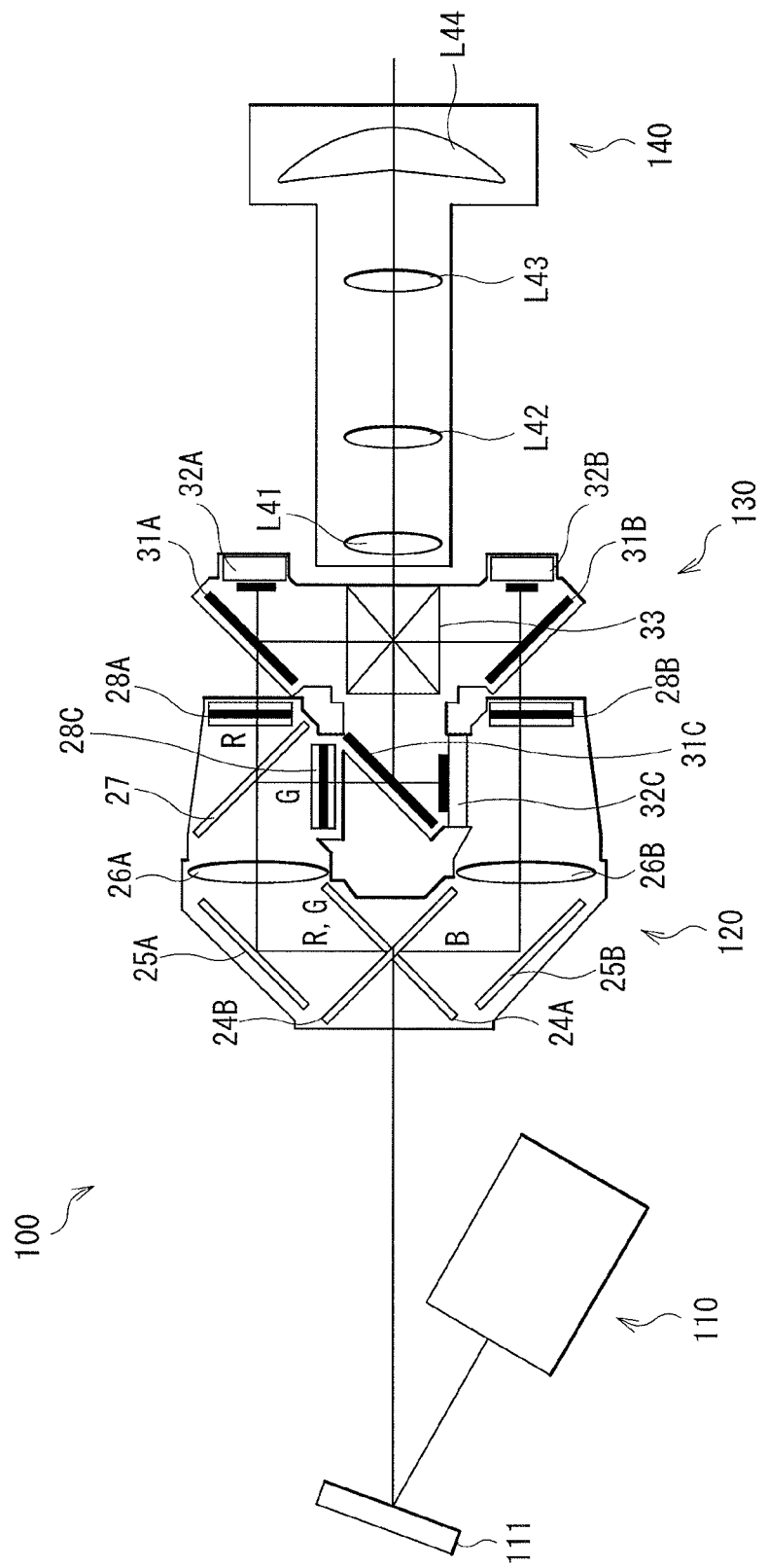
[FIG. 21]

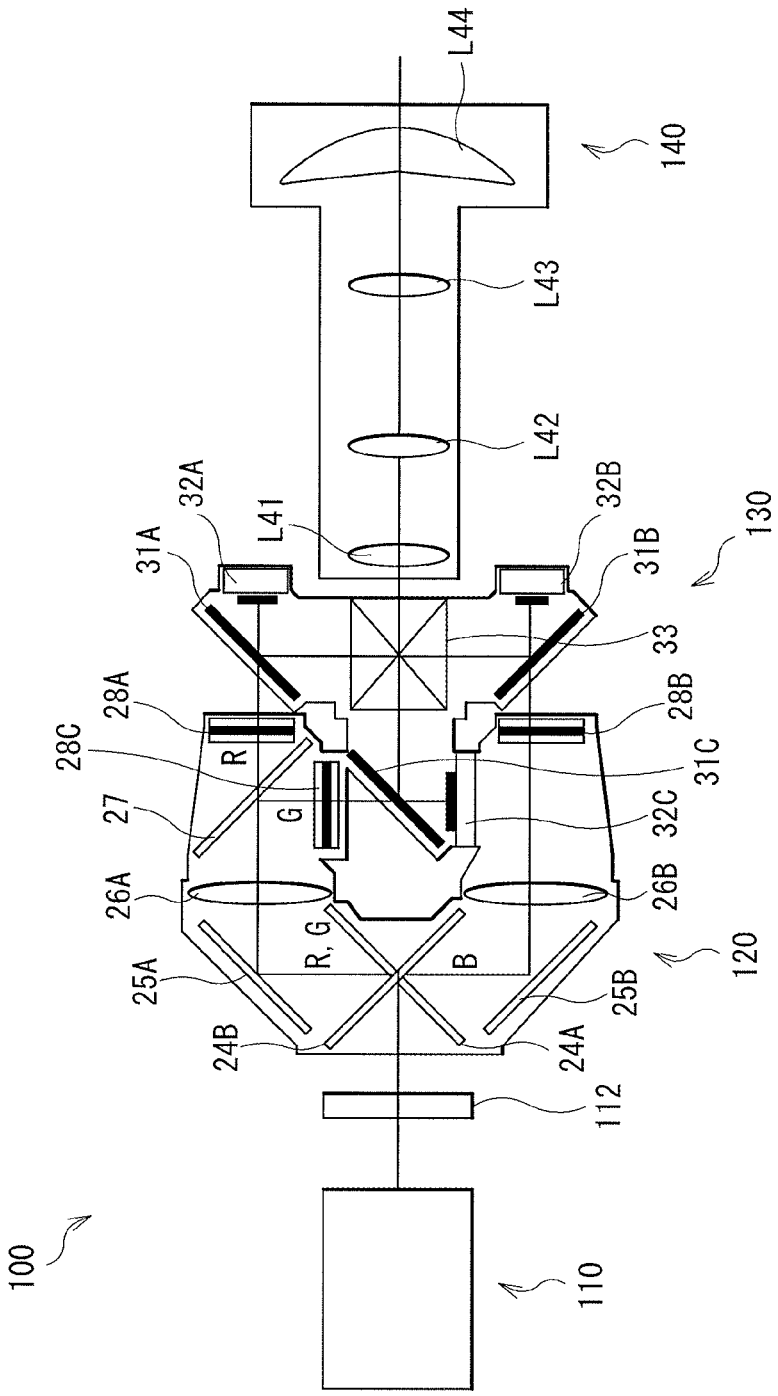
[FIG. 22]

[FIG. 23]

| OPTICAL ELEMENT | CONVEX LENS | CONCAVE LENS | LENS ARRAY | FRESNEL LENS | FREE-FORM SURFACE LENS |
|---|---|---|---|---|---|
| ◆ LENS<br><br>CHANGE OPTICAL PATH LENGTH BY CHANGING THICKNESS OF MATERIAL | | | | | |
| ◆ LIGHT PHASE MODULATION ELEMENT<br><br>CHANGE OPTICAL PATH LENGTH BY CHANGING REFRACTIVE INDEX<br><br>REFRACTIVE INDEX<br>LOW ▨ HIGH | | | | | |

[ FIG. 24 ]
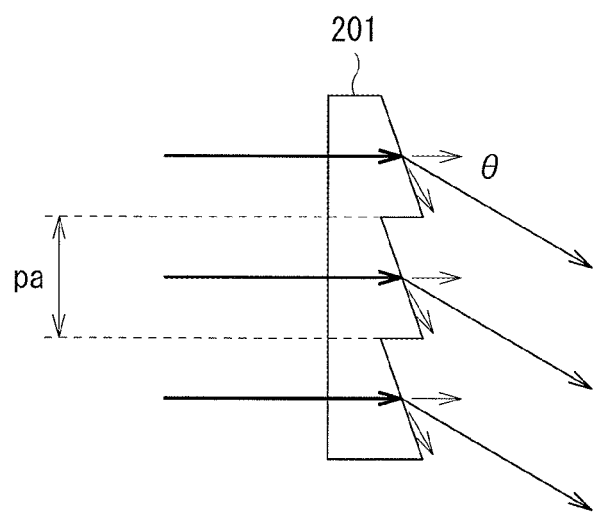
$\sin\theta \leqq \lambda/2pa$
DIFFRACTION ANGLE: $\theta$
WAVELENGTH: $\lambda$
DIFFRACTION PITCH: pa

[ FIG.25 ]
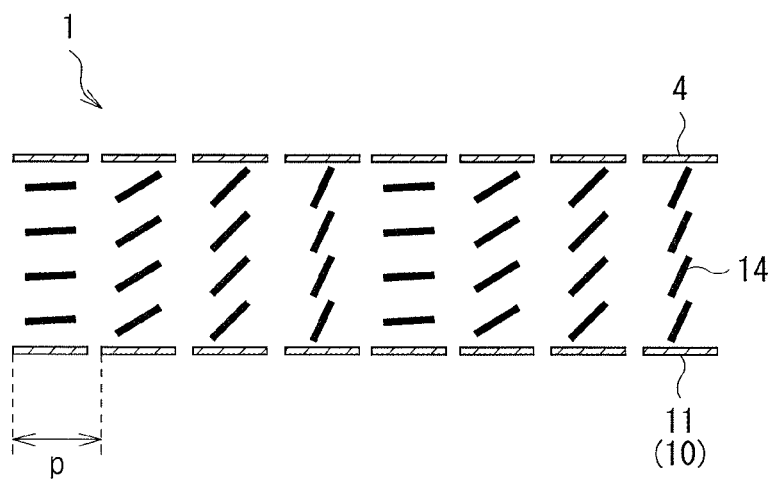
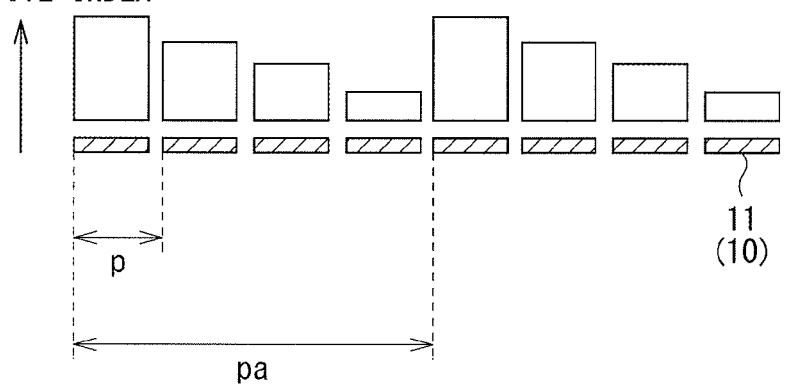

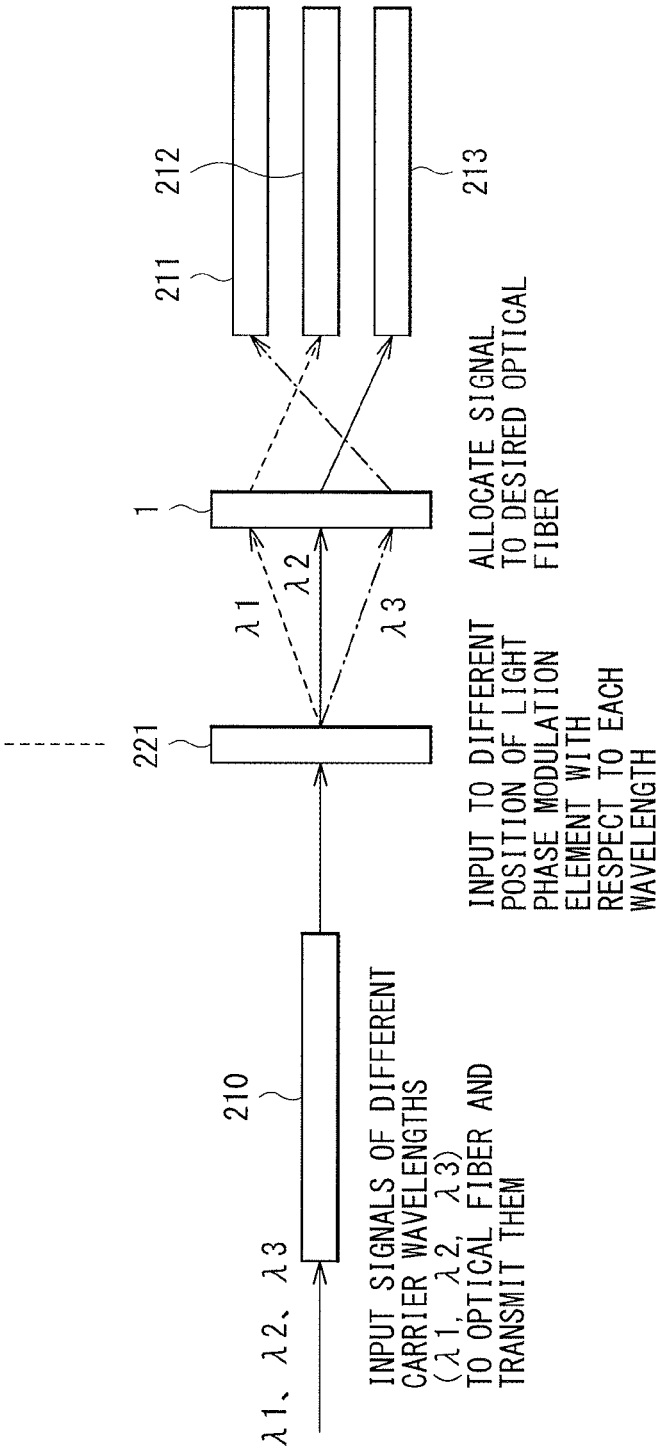
[FIG. 26]

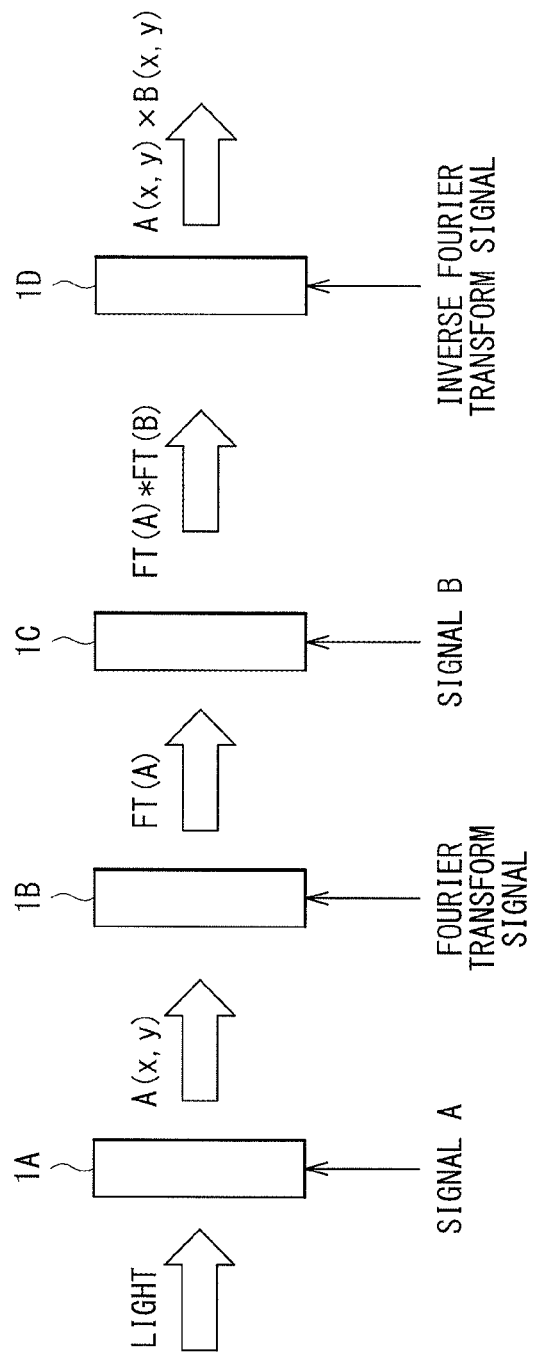
[FIG. 27]

PHASE MODULATOR, LIGHTING SYSTEM, AND PROJECTOR

CROSS REFERENCE TO RELATED APPLICATIONS

This application is a national stage application under 35 U.S.C. 371 and claims the benefit of PCT Application No. PCT/JP2018/027115 having an international filing date of 19 Jul. 2018, which designated the United States, which PCT application claimed the benefit of Japanese Patent Application No. 2017-152623 filed 7 Aug. 2017, the entire disclosures of each of which are incorporated herein by reference.

TECHNICAL FIELD

The present disclosure relates to a phase modulator that modulates a phase of light. The present disclosure also relates to a lighting, system that generates illumination light using a light phase modulation, element, as well as a projector that projects an image based on the illumination light.

There is known a light phase modulation element that obtains a desired reproduction image by modulating a phase of light. The light phase modulation element includes, for example, a spatial light modulator (SLM) such as a liquid crystal panel. One application example of such a light phase modulation element is a technology of generating a reproduction image phase-modulated in accordance with the image by using the light phase modulation element in a lighting system and using the reproduction image as illumination light to a light intensity modulation element for image display. Moreover, the light phase modulation element is used for holography technology and the like. The light phase modulation element is also used for technologies such as an optical switch, an optical computer, and the like.

CITATION LIST

Patent Literature

PTL 1: Japanese Unexamined Patent Application Publication (Published Japanese Translation of PCT Application) No. 2009-524845

PTL 2: Japanese Unexamined Patent Application Publication (Published Japanese Translation of PCT Application) No. 2011-507022

PTL 3: Japanese Unexamined Patent Application Publication No. 2014-206710

SUMMARY OF THE INVENTION

In the light phase modulation element high-order diffraction light is generated originating from a structure of a pixel, which may reduce diffraction efficiency.

It is desirable to provide a phase modulator, a lighting system, and a projector that allow for improving diffraction efficiency in a light Phase modulation element.

A first phase modulator according to an embodiment of the present disclosure includes a light phase modulation element that has a plurality of pixels with a pixel structure suppressing occurrence of high-order diffraction light and that modulates a phase of light with respect to each pixel.

A first lighting system according to an embodiment of the present disclosure includes a light source and a light phase modulation element that has a plurality of pixels with a pixel structure suppressing occurrence of high-order diffraction light and that modulates a phase of light from the light source with respect to each of the pixels.

A first projector according to an embodiment of the present disclosure includes a lighting, system and a light intensity modulation element that generates a projection image by modulating intensity of illumination light from the lighting, system, in which the lighting system includes a light source and a light phase modulation element that has, a plurality of pixels with a pixel structure suppressing occurrence of high-order diffraction light and that modulates a phase of light from the light source with respect to each of the pixels.

The first phase modulator, the first lighting system, or the first projector according to an embodiment of the present disclosure allow for suppressing occurrence of the high-order diffraction light originating from the structure of the pixels.

A second phase modulator according to an embodiment of the present disclosure includes a light phase modulation element that has a plurality of pixels and that modulates a phase of light with respect to each pixel, and a capturing optical system that captures a plurality of fluxes of high-order diffraction light generated in each of the pixels.

A second lighting system according to an embodiment of the present disclosure includes a light source, a light phase modulation element that has a plurality of pixels and that modulates a phase of light from the light source with respect to each of the pixels, and a capturing optical system that captures a plurality of fluxes of high-order diffraction light generated in each of the pixels.

A second projector according to an embodiment of the present disclosure includes a lighting system and a light intensity modulation element that generates a projection image by modulating intensity of illumination light from the lighting system, in which the lighting system includes a light source and a light phase modulation element that has a plurality of pixels with a pixel structure suppressing occurrence of high-order diffraction light and that modulates a phase of light from the light source with respect to each pixel.

The second phase modulator, the second lighting system, or the second projector according to an embodiment of the present disclosure allows the plurality of fluxes of high-order diffraction light generated in each pixel of the light phase modulation element to be captured by the capturing optical system.

In accordance with the first phase modulator, the first lighting system, or the first projector according to an embodiment of the present disclosure, because the pixel structure of the light phase modulation element is made to suppress occurrence of the high-order diffraction light, it is possible to improve diffraction efficiency in the light phase modulation element.

In accordance with the second phase modulator, the second lighting system, or the second projector according to an embodiment of the present disclosure, because the plurality of fluxes of high-order diffraction light generated in each pixel of the light phase modulation element is captured by the capturing optical system, it is possible to improve diffraction efficiency in the light phase modulation element.

It is to be noted that the effects described herein are not necessarily limiting and there may be any of effects set forth herein.

BRIEF DESCRIPTION OF DRAWING

FIG. 1 is a schematic plan view of an example of a light phase modulation element according to a comparison example.

FIG. 2 is an explanatory drawing illustrating an example of relationship between a pixel position and a phase modulation amount of the light phase modulation element according to the comparison example.

FIG. 3 is a cross-sectional view of an example configuration of the light phase modulation element according to the comparison example.

FIG. 4 is a block diagram illustrating an example circuit configuration of a phase modulator according to the comparison example.

FIG. 5 is an explanatory drawing illustrating occurrence of high-order diffraction light generated in the light phase modulation element, according to the comparison example.

FIG. 6 is an explanatory drawing illustrating a pixel structure of the light phase modulation element according to the comparison example.

FIG. 7 is an explanatory drawing illustrating a diffraction phenomenon in a case where the pixel structure of the light phase modulation element according to the comparison example is not taken into consideration.

FIG. 8 is an explanatory drawing illustrating a diffraction phenomenon in a case where the pixel structure of the light phase modulation element according to the comparison example is taken into consideration.

FIG. 9 is an explanatory thawing illustrating an example configuration of a light phase modulation element in a phase modulator according to a first embodiment of the present disclosure.

FIG. 10 is an explanatory drawing illustrating a pixel structure of the light phase modulation element in the phase modulator according to the first embodiment.

FIG. 11 is a cross-sectional view of an example of a pixel structure of a light phase modulation element in a phase modulator according to a second embodiment.

FIG. 12 is a plan view of an example of the pixel structure of the light phase modulation element according to the comparison example.

FIG. 13 is a plan view of a first example of a pixel structure of a light phase modulation element in a phase modulator according to the second embodiment.

FIG. 14 is a plan view of a second example of the pixel structure of the light phase modulation element in the phase modulator according to the second embodiment.

FIG. 15 is a plan view of a third example of the pixel structure of the light phase modulation element in the phase modulator according to the second embodiment.

FIG. 16 is an explanatory drawing illustrating an example of the pixel structure of the light phase modulation element in the phase modulator according to the second embodiment and a diffraction pattern originating from the pixel structure.

FIG. 17 is a plan view of a fourth example of the pixel structure of the light phase modulation element in the phase modulator according to the second embodiment, FIG. 18 is a cross-sectional view of a first example configuration of a phase modulator according to a third embodiment.

FIG. 19 is a cross-sectional view of a second example configuration of the phase modulator according to the third embodiment.

FIG. 20 is a cross-sectional view of a third example configuration phase modulator according to the third embodiment.

FIG. 21 is a configuration diagram illustrating a first application example in which the light phase modulation element is applied to a projector.

FIG. 22 is a configuration diagram illustrating a second application example in which the light phase modulation element is applied to the projector.

FIG. 23 is an explanatory drawing illustrating ao application example in which the light phase modulation element plied to various optical elements.

FIG. 24 is a cross-sectional view an example blazed diffraction grating.

FIG. 25 is an explanatory drawing illustrating an application example which the light phase modulation element is applied to the blazed diffraction grating.

FIG. 26 is an explanatory drawing illustrating an application example in which the light phase modulation element is, applied to an optical switch.

FIG. 27 is an explanatory drawing illustrating an application example which the light phase modulation element is applied to an optical computer.

MODES FOR CARPING OUT THE INVENTION

In the following, embodiments of the present disclosure are described in detail with reference to the drawings. It is to be noted that the description is made in the following order.

1. First Embodiment (FIGS. 1 to 10)
  1.1. Outline of Phase Modulator According to Comparison Example,
  1.2. Problem with Phase Modulator According to Comparison Example and Configuration for Solving the Problem
  1.3. Effects
2. Second Embodiment (FIGS. 11 to 17)
  2.1 Configuration
  2.2 Effects
3. Third Embodiment (FIGS. 18 to 20)
  3.1 Configuration
  3.2 Effects
4. Fourth Embodiment (Application Example of Light Phase Modulation Element) (FIGS. 21 to 27)
  4.1 Application Example to Projector
  4.2 Application Example to Various Optical Elements
  4.3 Application Example to Optical Switch
  4.4 Application Example to Optical Computer
5. Other Embodiments 1. First Embodiment

[1.1. Outline of Phase Modulator According to Comparison Example]

FIG. 1 schematically illustrates an example of a light phase modulation element 101 applied to a phase modulator according to a comparison example. FIG. 2 illustrates an example relationship between a pixel position and a phase modulation amount of the light phase modulation element 101. FIG. 3 illustrates an example cross-sectional configuration of the light phase modulation element 101.

The light phase modulation element 101 has a plurality of pixels 10 arranged in a first direction (e.g. horizontal (lateral) direction) and a second direction (e.g. vertical (longitudinal) direction) in a matrix. In the light phase modulation element 101, it is possible to use the pixels 10 as a diffraction grating by modulating a phase of light from the light source with respect to each pixel 10. For example, as illustrated in FIG. 2, it is possible to configure a blazed diffraction grating. In FIG. 2, a horizontal axis indicates the pixel position and a vertical axis indicates the phase modulation amount. The modulation amount of the phase is, for example, in a range of 0 to 2 π.

The light phase modulation element 101 includes, for example, a phase modulation liquid crystal panel. The light phase modulation element 101 may include a digital mirror device (DMD).

FIG. 3 illustrates an example of the light phase modulation element 101 including the phase modulation liquid crystal panel. The light phase modulation element 101 includes, for example, a first glass substrate 2 and a second glass substrate 3 disposed opposite to each other. A liquid crystal layer 13 containing liquid crystal molecules 14 is sealed by an unillustrated sealing member between the first glass substrate 2 and the second glass substrate 3.

The first glass substrate 2 is provided with a counter electrode (common electrode) 4. The second glass substrate 3 is provided with a plurality of pixel electrodes 11. FIG. 3 illustrates, as an example of the plurality of pixel electrodes 11, only two adjacent pixel electrodes.

The counter electrode 4 is applied with common voltage (e.g., 0 [V]) common to the plurality of pixel electrodes 11. The plurality of pixel electrodes 11 is applied with applied voltage (e.g., V1 [V]) in accordance with an input signal. The phase modulation amount of each pixel 10 in the light phase modulation element 101 changes depending on the applied voltage.

The light phase modulation element 101 may be a reflective phase modulation liquid crystal panel or a transmissive phase modulation liquid crystal panel. In the case of the reflective phase modulation liquid crystal panel, the counter electrode 4 includes a transparent electrode that transmits light, and the pixel electrode 11 includes a reflective electrode that reflects light. In the case of the transmissive phase modulation liquid crystal panel, both the counter electrode 4 and the pixel electrode 11 include the transparent electrode that transmits light.

Such a light phase modulation element 101 is used as a portion of the lighting system that generates illumination light to the light intensity modulation element in a projector, for example. Moreover, the light phase modulation element 101 is also used in a holography technology or the like. Furthermore, the light phase modulation element 101 is also used in technologies such as an optical switch and an optical computer.

FIG. 4 illustrates an example circuit configuration of a phase modulator according to the comparison example.

The phase modulator includes the light phase modulation element 101 that modulates die phase of light from a light source 50, a phase distribution arithmetic circuit 51, and a phase modulation element drive circuit 52.

The phase distribution arithmetic circuit 51 is a phase distribution arithmetic unit that generates target phase distribution data (phase modulation signal) on the basis of an input signal. The target phase distribution data is data having a phase distribution that makes it possible to reproduce an aimed reproduction image 60 (target reproduction image) by the light phase modulation element 101.

Here, for example, in a ease where the light phase modulation element 101 is used as a portion of the lighting system in the projector, the input signal is a image signal, for example. In this case, the reproduction image 60 is an illumination image that illuminates an illuminated object 5. The illuminated object 5 is, for example, a light intensity modulation element such as an intensity modulation liquid crystal panel in the projector. In this case, the target phase distribution data is data having a phase distribution pattern that makes it possible to form an illumination image with a luminance distribution corresponding to the image to be displayed by the projector.

The diffraction element drive circuit 52 generates applied voltage (drive voltage) based on the target phase distribution data generated by the phase distribution arithmetic circuit 51, and drives the light phase modulation element 101 to bring each pixel 10 into the aimed phase distribution.

The light phase modulation element 101 modulates the phase of light from the light source 50 on the basis of the applied voltage given by the diffraction element drive circuit 52.

[1.2. Problem with Phase Modulator According to Comparison Example and Configuration for Solving the Problem]

Next, a problem with the phase modulator according to the comparison example and a configuration of a phase modulator according to a first embodiment for solving the problem are described. It is to be noted that, in the following, components similar to those of the phase modulator according to the comparison example are denoted with the same reference numerals, and descriptions thereof are omitted where appropriate.

FIG. 5 is an explanatory drawing illustrating occurrence of high-order diffraction light generated in the light phase modulation element 101 according to the comparison example.

In the light phase modulation element 101 according to the comparison example, the plurality of pixels 10 is arranged at regular intervals (at constant periods) at the same pixel pitch (pixel pitch) p in the lateral direction and the longitudinal direction. Thus, in the light phase modulation element 101 according to the comparison example, as illustrated in FIG. 5, when assuming the pixel pitch as p, a diffraction angle as $\theta$, and a wavelength of incident light as $\lambda$, the high-order diffraction light is generated at the periods calculated by the following, expression on a reproduction surface (Fourier-transformed surface), in addition to 0-th order light. The high-order diffraction light causes reduction of diffraction efficiency in the light phase modulation element 101.

$$\sin \theta = \lambda/p$$

FIG. 6 is an explanatory drawing illustrating a pixel structure of the light phase modulation element 101 according to the comparison example.

The pixel structure of the light phase modulation element 101 according to the comparison example is represented by a comb function comb(x) as illustrated in FIG. 6. Additionally, a function obtained by Fourier-transforming the comb function comb(x) is represented by a comb function comb (u).

FIG. 7 is an explanatory drawing illustrating a diffraction phenomenon in a case where the pixel structure of the light phase modulation element 101 according to the comparison example is not taken into consideration.

As illustrated in FIG. 7, when the pixel structure is not taken into consideration, the reproduction image (diffraction image) $G(\mu,v)$ by a phase distribution $g(x,y)$ in the light phase modulation element 101 is represented by a function FT $[g(x,y)]$ that is obtained by Fourier-transforming the phase distribution $g(x,y)$. Moreover, assuming a propagated distance from the light phase modulation element 101 to the reproduction surface as L, a range D in which an image is allowed to be formed by diffraction of the light phase modulation element 101 is $L(\lambda/2p)$.

FIG. 8 is an explanatory drawing illustrating a diffraction phenomenon in a case where the pixel structure of the light phase modulation element 101 according to the comparison example is taken into consideration.

As illustrated in FIG. 8, when the pixel structure is taken into consideration, a distribution function of the light phase modulation element 101 is represented by a product of the phase distribution g(x,y) and a comb function comb(x/p)·comb(y/p) indicative of the pixel structure, as indicated by Expression (1) in FIG. 8. The reproduction image (diffraction image) Ga(μ,ν) in this case is represented by a convolution function of the function FT [g(x,y)] obtained by Fourier-transforming the phase distribution g(x,y) and the function FT [comb(x/p)·comb(y/p)] obtained by Fourier-transforming the comb function comb indicative of the pixel structure, as indicated by Expression (2) in FIG. 8. Moreover, a period T of the high-order diffraction light generated by diffraction of the pixel structure is L(λ/p).

FIG. 9 is an explanatory drawing illustrating an example configuration of a light phase modulation element 1 in a phase modulator according to the first embodiment of the present disclosure.

To suppress occurrence of the high-order diffraction light as described above, the light phase modulation element 1 according to the present embodiment has a structure in which the pixel structure suppresses occurrence of the high-order dilution light.

In the light phase modulation element 1 according to the present embodiment, as illustrated in FIG. 9, the plurality of pixels 10 is arranged at irregular intervals (aperiodically) at the same pixel pitch (pixel pitch) p in the lateral direction and the longitudinal direction. In the light phase modulation element 1 according to the present embodiment, the pixels are arranged with the pixel pitches p of two adjacent pixels 10 being different from one another. It is to be noted that FIG. 9 illustrates only three different pixel pitches p1, p2, and p3 as an example. Such a structure is achieved by, for example, making a width (pixel groove width) between adjacent pixels different from one another depending on the pixel position. In this case, the pixels 10 are arranged such that pixel groove pitches of pixel grooves 12 each defined between two adjacent pixels are different from one another. This may allow the pixels 10 to be arranged with a center of gravity of the pixel 10 or the center of gravity of the pixel groove 12 varying depending on the pixel position. FIG. 9 illustrates only two different pixel groove pitches pg1 and pg2 as an example. In this case, by varying the center of gravity of the pixel groove width depending on the pixel position, periodicity of the pixel pitch p is reduced and high-order diffraction components are reduced.

It is to be noted that the plurality of pixels 10 may be arranged at irregular intervals (aperiodically) in either one of the lateral direction and the longitudinal direction.

FIG. 10 is an explanatory drawing illustrating a pixel structure of the light phase modulation element 1 in the phase modulator according to the first embodiment.

The pixel structure of the light phase modulation element 101 according to the comparison example is represented by the comb function comb(x), as illustrated in an upper portion of FIG. 10. To the contrary, in the light phase modulation element according to the present embodiment, the pixel structure is represented by a function different from the comb function comb(x), as illustrated in a lower portion of FIG. 10.

[1.3 Effects]

As described above, according to the present embodiment, because the pixel structure of the light phase modulation element 1 is made to suppress occurrence of the high-order diffraction light, it is possible to improve diffraction efficiency in the light phase modulation element 1.

Moreover, it is possible to reduce an effect of stray light caused by the high-order diffraction light.

It is to be noted that the effects described in this specification are merely examples and not limited thereto, but there may be other effects. The same applies to the effects of other embodiments hereinbelow.

2. Second Embodiment

Next, a phase modulator according to a second embodiment of the present disclosure is described. It is to be noted that, in the following, components similar to those of the phase modulator according to the lint embodiment are denoted with the same reference numerals, and descriptions thereof are omitted where appropriate.

[2.1 Configuration]

FIG. 11 illustrates an example of a pixel structure of the light phase modulation element 1 in the phase modulator according to the second embodiment.

The light phase modulation element 1 may include a plurality of pixel electrodes 11, and a light shielding layer 82, a signal line layer 83, and a transistor/capacitor region 84 that are disposed below the pixel electrodes 11, Respective layers are coupled to each other via a contact hole 81.

FIG. 12 illustrates an example of the pixel structure of the light phase modulation element 101 according to the comparison example.

In the light phase modulation element 101 according to the comparison example, the plurality of pixel electrodes 11 is arranged at regular intervals (at constant periods) at the same pixel pitch (pixel pitch) p in the lateral direction and the longitudinal direction. The contact holes 81 are disposed on the pixel electrodes 11 to have a pitch pc that is different from the pixel pitch p.

FIG. 13 illustrates a first example of a pixel structure of the light phase modulation element 1 in the phase modulator according to the second embodiment. FIG. 14 illustrates a second example of the pixel structure of the light phase modulation element 1 in the phase modulator according to the second embodiment.

Also in the light phase modulation element 1 according to the present embodiment, as in the light phase modulation element 101 according to the comparison example, the plurality of pixel electrodes 11 is arranged at regular intervals at constant periods) at the same pixel pitch (pixel pitch) p in the lateral direction and the longitudinal direction. Moreover, the contact holes 81 are provided on the pixel electrodes 11 to have the pitch pc that is substantially the same as the pixel pitch p. This allows an arrangement period of the pixel electrodes 11 to be substantially the same as the arrangement period of the contact holes 81 in the lateral direction and the longitudinal direction.

FIG. 15 illustrates a third example of the pixel structure of the light phase modulation element 1 in the phase modulator according to the second embodiment.

Moreover, as illustrated in FIG. 15, the light phase modulation element 1 according to the present embodiment may have random arrangement periods of the contact holes 81 in the lateral direction and the longitudinal direction. That is, the contact holes 81 may be arranged aperiodically. This allows the pitch pc of the contact holes 81 to be varied depending on the pixel position. It is to be noted that FIG. 15 illustrates only two different pixel pitches pc1 and pc2 as an example.

FIG. 16 illustrates an example of the pixel structure of the light phase modulation element 1 in the phase modulator according to the second embodiment and a diffraction pattern originating from the pixel structure.

An upper portion of FIG. 16 illustrates an example of a spatial frequency component and a diffraction pattern in a case where the arrangement period of the pixel electrodes 11 and the arrangement period of the contact holes 81 are substantially the same. A lower portion of FIG. 16 illustrates an example of a spatial frequency component and a diffraction pattern in a case where the arrangement period of the pixel electrodes 11 and the arrangement period of the contact holes 81 are different from each other, as a comparison example. In the case of the comparison example, the arrangement period of the contact holes 81 causes a short-period diffraction light, which reduces diffraction efficiency.

FIG. 17 illustrates a fourth example of the pixel structure of the light phase modulation element 1 in the phase modulator according to the second embodiment.

FIG. 17 illustrates the pixel structure taking into account a base electrode layer 85 disposed below the pixel electrodes 11. Here, the base electrode layer 85 may be the light shielding layer 82 illustrated in FIG. 11, for example.

As illustrated in FIG. 17, it is preferable to set an arrangement to make a pitch pd of the base electrode layer 85 substantially the same as the pixel pitch p. Thus, it is preferable to make the arrangement period of the pixel electrodes substantially the same as the arrangement period of the base electrode layer 85 in, the lateral direction and the longitudinal direction. This makes it possible to reduce unwanted diffraction light originating from the base electrode layer 85.

[2.2 Effects]

According to the present embodiment, because the pixel structure takes into account the structure of the contact hole 81, it is possible to improve diffraction efficiency in the light phase modulation element 1. Moreover, it is possible to reduce an effect of stray light caused by the high-order diffraction light.

Other configurations may be substantially the same as those of the phase modulator according to the above-described first embodiment.

3. Third Embodiment

Next, a phase modulator according to a third embodiment of the present disclosure is described, it is to be noted that, in the following, components similar to those of the phase modulator according to the first or second embodiment are denoted with the same reference numerals, and descriptions thereof are omitted where appropriate.

[3.1 Configuration]

A phase modulator according to the present embodiment includes a capturing optical system that captures a plurality of fluxes of high-order diffraction light generated in each pixel 10 of the light phase modulation element 1. It is to be noted that the light phase modulation element 1 in the phase modulator according to the present embodiment may include the light phase modulation element 101 according to the above-described comparison example. When the light phase modulation element 101 according to the comparison example is included, as described above, the plurality of fluxes of high-order diffraction light is likely to occur in each, pixel 10. The present embodiment aims to improve diffraction of by capturing the high-order diffraction light as effective diffraction light with the capturing optical system.

FIG. 18 illustrates a first example configuration of the phase modulator according to the present embodiment.

In FIG. 18, the capturing optical system includes a plurality of mirrors 91 that reflect the plurality of fluxes of high-order diffraction light emitted from die light phase modulation element 1 and a fly-eye lens array 92 that captures the plurality of fluxes of high-order diffraction light reflected by the plurality of mirrors. The fly-eye lens array 92 has a plurality of fly-eye lenses 92A.

It is to be noted that the capturing optical system may have substantially the same configuration in a direction perpendicular to the page of FIG. 18.

FIG. 19 illustrates a second example configuration of the phase modulator according to the present embodiment.

In FIG. 19, the capturing optical system includes a plurality of prisms 93 as optical path length correction members that correct respective optical path lengths of the plurality of fluxes of high-order diffraction light emitted from the light phase modulation element 1 and the fly-eye lens array 92 that captures the plurality of fluxes of high-order diffraction light with the optical path lengths having been corrected by the plurality of prisms 93. The fly-eye lens array 92 has the plurality of fly-eye lenses 92A.

FIG. 20 illustrates a third example configuration of the phase modulator according to the present embodiment.

FIG. 20 illustrates live example configuration in which the phase modulator according to the present embodiment is combined with an illumination optical system 320 included in the projector, for example. The illumination optical system 320 is an optical system that illuminates a light intensity modulation element 301 via a polarization separation element 302 such as a dichroic prism.

The illumination optical system 320 has a condenser lens 321. The illumination optical system 320 may have an optical element 322 such as a mirror.

In FIG. 20, a high-order light capturing optical system 310 is included as the capturing optical system. The high-order light capturing optical system 310 has a pair of a lens array 311 and a lens array 312 that captures the plurality of fluxes of high-order diffraction light emitted from the light phase modulation element 1 and a condenser lens 313. The condenser lens 313 of the high-order light capturing optical system 310 configures a portion of a telecentric optical system 330 together with the condenser lens 321 of the illumination optical system 320.

[3.2 Effects]

According to the present embodiment, because the plurality of fluxes of high-order diffraction light generated in each pixel 10 of the light phase modulation element 1 is captured by the capturing optical system, it is possible to improve diffraction efficiency in the light phase modulation element 1. Moreover, it is possible to reduce an effect of stray light caused by the high-order diffraction light.

Other configurations may be substantially the same as those of the phase modulator according to the above-described first or second embodiment.

4. Fourth Embodiment

Next, a fourth embodiment of the present disclosure is described. It is to be noted that, in the following, components similar to those of the phase modulator according to the first to third embodiments are denoted with the same reference numerals, and descriptions thereof are omitted where appropriate.

In the present embodiment, an application example of the light phase modulation element 1 is described,

[4.1 Application Example to Projector]

A projector according to the present embodiment includes a lighting system and a light intensity modulation element that generates a projection image by modulating intensity of illumination light from the lighting system. The lighting system includes a light source and a phase modulator that modulates the phase of light from the light source. The phase modulator includes the phase modulator according to the above-described first to third embodiments, and includes the light phase modulation element 1. A reproduction image by the light phase modulation element 1 is used as an illumination image having a luminance distribution corresponding to an image to be displayed by the projector. The illumination image is used as the illumination light to the light intensity modulation element.

FIG. 21 illustrates a first application example its which the light phase modulation element 1 is applied to a projector 100.

The first application example is an example configuration in a case where the light phase modulation element 1 is a reflective light phase modulation element 111.

The projector 100 includes a light source device 110, an illumination optical system 120, an image forming unit 130, and a projection optical system 140. The reflective light phase modulation element 111 is disposed between the light source device 110 and the illumination optical system 120.

The image forming unit 130 has reflective polarizing plates 31A, 31B, and 31C, reflective liquid crystal panels 32A, 32B, and 32C, and a dichroic prism 33. The reflective liquid crystal panels 32A, 32B, and 32C are light intensity modulation elements.

The light source device 110 emits light including red light, green light, and blue light. The light source device 110 includes one or more laser light sources emitting white light including red light, green light, and blue light, for example. Alternatively, the light source device 110 may include one or more laser light sources for each color, and the one or more laser light sources for each color may emit red (k) light, green (co hot, or blue (B) light.

The reflective light phase modulation element 111 generates a desired illumination image (illumination light) by modulating the phase of light from the light source device 110. The illumination light generated by the reflective light phase modulation element 111 illuminates the reflective crystal panels 32A, 32B, and 32C via the illumination optical system 120.

The illumination optical system 120 has dichroic mirrors 24A and 24B, reflective mirrors 25A and 25B, lenses 26A and 26B, a dichroic mirror 27, and polarizing plates 28A, 28B, and 28C.

The dichroic mirrors 24A and 24B selectively reflect light in a predetermined wavelength region and selectively transmit light in other wavelength regions. For example, the dichroic mirror 24A reflects mainly red light and green light in a direction of die reflective mirror 25A. Moreover, the dichroic mirror 24B reflects mainly blue light in a direction of the reflective mirror 25B, file reflective mirror 25A reflects the light (mainly red light and green light) from the dichroic mirror 24A toward the lens 26A. The reflective mirror 25B reflects the light (mainly blue light) from the dichroic mirror 24B toward the lens 26B. The lens 26A transmits the light (mainly red light and green light) from the reflective mirror 25A to be condensed on the dichroic mirror 27. The lens 26B transmits the light (mainly blue light) from the reflective mirror 25B to be condensed on the dichroic mirror 27. The dichroic mirror 27 selectively reflects green light and also selectively transmits light in other wavelength, regions. The dichroic mirror 27 transmits a red light component and reflects a green light component toward the polarizing plate 28C, for example. The polarizing plates 28A, 28B, and 28C include a polarizer having a polarization axis in a predetermined direction. The polarizing plates 28A, 28B, and 28C transmit p-polarized light and reflect s-polarized light, for example.

The reflective polarizing plates 31A, 31B, and 31C respectively transmit light (e.g, p-polarized light) having the same polarization axis, as that of polarized light from the polarizing plates 28A, 28B, and 28C, and, reflect light (s-polarized light) having a different polarization axis. In particular, the reflective polarizing plate 31A transmits p-polarized red light from the polarizing plate 28A in a direction of the reflective liquid crystal panel 32A. The reflective polarizing plate 31B transmits p-polarized blue light from the polarizing plate 28B in a direction of the reflective liquid crystal panel 32B. The reflective polarizing plate 31C transmits p-polarized green light from the polarizing plate 28C in a direction of the reflective liquid crystal panel 32C. Furthermore, the reflective polarizing plate 31A reflects s-polarized red light from the reflective liquid crystal panel 32A to eater the dichroic prism 33. The reflective polarizing plate 31B reflects s-polarized blue light from the reflective liquid crystal panel 32B to enter the dichroic prism 33. The reflective polarizing plate 31C reflects s-polarized green light from the reflective liquid crystal panel 32C to enter the dichroic prism 33.

The reflective liquid crystal panels 32A, 328, and 32C respectively modulate intensities of red light, blue light, or green light.

The dichroic prism 33 combines the red light, blue light, or green light of which intensities have been modulated by the reflective liquid crystal panels 32A, 32B, and 32C, and emits the combined light toward the projection optical system 140 as a projection image.

The projection optical system 140 has lenses L41, L42, L43, and L44. The projection optical system 140 magnifies the projection image generated by the image forming unit 130 and projects it to a projection surface such as a screen that is not illustrated. It is to be noted that the number of lenses and the lens configuration in the projection optical system 140 are not limited to the illustrated configuration, hut may take other numbers of lenses and lens configurations. Optionally, other optical elements such as a reflective minor and an optical filter may be included in the optical path.

FIG. 22 illustrates a second application example in which the light phase modulation element 1 is applied to the projector 100.

The second application example is an example configuration in a case where the light phase modulation element 1 is a transmissive light phase modulation element 112.

The transmissive light phase modulation element 112 is disposed between the light source device 110 and the illumination optical system 120.

Other configurations are similar to those in the first application example illustrated in FIG. 21.

[4.2 Application Example to Various Optical Elements]

FIG. 23 illustrates an application example in which the light phase modulation element 1 is applied to various optical elements.

As illustrated in FIG. 23, various lenses such as a convex lens, a concave lens, a lens array, a Fresnel lens, and a free-form surface lens are known as various optical elements. These lenses allow the optical path length to be changed by chancing thickness of a lens material. In the light phase modulation element 1, it is possible to change the optical path length by changing a refractive index distribution in the element. This makes it possible to obtain optical characteristics equivalent to those of various lenses.

FIG. 24 illustrates an example of a blazed diffraction grating 201.

The blazed diffraction grating 201 is a diffraction grating having a serrated cross-sectional shape. The blazed diffraction grating 201 supports the following expression, when representing a diffraction pitch as pa, a diffraction angle as θ, and a wavelength of incident light as λ.

$$\sin \theta \leq \lambda/2pa.$$

FIG. 25 illustrates an application example in which the light phase modulation element 1 is applied to the blazed diffraction grating 201.

As also illustrated in FIGS. 1 to 3, it is possible to use the light phase modulation element 1 as the diffraction grating by changing the refractive index distribution in the element by modulating the phase of light from the light source with respect to each pixel 10. As illustrated in FIG. 25, although the pixel pitch of the light phase modulation element 1 is p, by serrating the refractive index distribution in the plurality of pixels 10, it is possible to obtain the optical characteristics equivalent to those of the blazed diffraction grating 201 having a diffraction pitch pa.

[4.3 Application Example to Optical Switch]

FIG. 26 illustrates an application example in which the light phase modulation element 1 is applied to an optical switch.

The optical switch includes an optical fiber 210, a diffraction grating 221, and a plurality of optical fibers 211, 212, and 213. The light phase modulation element 1 is disposed between the diffraction grating 221 and the plurality of optical fibers 211, 212, and 213, Alternatively, the light phase modulation element 1 may be further disposed in place of the diffraction grating 221.

This optical switch allows signals of different carrier wavelengths (λ1, λ2, λ3) to be inputted to the optical fiber 210 and transmitted. The diffraction grating 221 separates signals, whereby the signal of each earner wavelength transmitted by the optical fiber 210 is inputted to different position in the light phase modulation element 1 with respect to each wavelength. The signal of each carrier wavelength inputted to the light phase modulation element 1 is allocated to a desired optical fiber among the Plurality of optical fibers 211, 212, and 213.

[4.4 Application Example to Optical Computer]

FIG. 27 illustrates an application example in which the light phase modulation element 1 is applied to an optical computer.

This optical computer includes a plurality of light phase modulation elements 1A, 1B; 1C, and 1D each including the light phase modulation element 1.

A signal A(x,y) based on a signal A is generated by modulating ca phase of incident light by a light phase modulation element 1A. Next, a signal FT(A) is obtained by Fourier-transforming the signal A(x,y) using a light phase modulation element B. Next, a convolution signal FT(A)*FT(B) with the signal B is obtained by a light phase modulation element 1C. Next, a product A(x,y)×B(x,y) of the signal A(x,y) and the signal B(x,y) is obtained by inverse Fourier-transforming the signal FT(A)*FT(B) by a light phase modulation element 1D.

5. Other Embodiments

The technology according to the disclosure is not limited to the description of each embodiment described above, but various modifications are possible.

For example, the present technology may have the following configurations.

(1)
A phase modulator including:
a light phase modulation element that has a plurality of pixels with a pixel structure suppressing occurrence of high-order diffraction light and that modulates a phase of light with respect to each of the pixels.

(2)
The phase modulator according to (1), in which the plurality of pixels is arranged in a first direction and a second direction in a matrix and arranged to change a pitch of a pixel groove between two adjacent pixels in at least one of the first direction or the second direction.

(3)
The phase modulator according to (1), in which the plurality of pixels is arranged in a first direction and a second direction in a matrix and arranged to change a center of gravity of the pixel or the center of gravity of the pixel groove between two adjacent pixels in at least one of the first direction or the second direction.

(4)
The phase modulator according to (1), in which the plurality of pixels is arranged in a first direction and a second direction in a matrix,
the each of the pixels includes a pixel electrode and a contact hole coupled to the pixel electrode, and
an arrangement period of the pixel electrode and an arrangement period of, the contact hole are substantially same in a least one of the first direction or the second direction.

(5)
The phase modulator according to (1), in which the plurality of pixels is arranged in a first direction and a second direction in a matrix,
the each of the pixels includes a pixel electrode and a contact hole coupled to the pixel electrode, and
the contact hole is arranged aperiodically in at least one of the first direction or the second direction.

(6)
The phase modulator according to (1) or (4), in which the plurality of pixels is arranged in a first direction and a second direction in a matrix,
the each of the pixels includes a pixel electrode and a base pixel electrode disposed below the pixel electrode, and
an arrangement period of the pixel electrode and an arrangement period of the base electrode layer are substantially same in at least one of the first direction or the second direction.

(7)
A phase modulator including:
a light phase modulation element that has a plurality of pixels and that modulates a phase of light with respect to each of the pixels; and
a capturing optical system that captures a plurality of fluxes of high-order diffraction light generated in the each of the pixels.

(8)
The phase modulator according to (7), in which the capturing optical system includes
a mirror that reflects the plurality of fluxes of high-order diffraction light emitted from the light phase modulation element, and
a lens array that captures the plurality of fluxes of high-order diffraction light reflected by the mirror.

(9)

The phase modulator according to (7), in which
the capturing optical system includes
a plurality of optical path length correction members that correct respective optical path length of the plurality of fluxes of high-order diffraction light emitted by the fight phase modulation element, and
a lens array.

(10)

The phase modulator according to (7), in which
the capturing, optical system includes
a lens array that captures the plurality of fluxes of high-order diffraction light emitted from the light phase modulation element, and
a condenser lens that configures a portion of a telecentric optical system.

(11)

A lighting system including:
a light source; and
a light phase modulation element that has a plurality of pixels with a pixel structure suppressing occurrence of high-order diffraction light and that modulates a phase of light from the light source with respect to each of the pixels.

(12)

A lighting system including:
a light source;
a light phase modulation element that has a plurality of pixels and that modulates a phase of light from the light source with respect to each of the pixels; and
a capturing optical system that captures a plurality of fluxes of high-order diffraction light generated in each of the pixels.

(13)

A projector including:
a lighting system and
a light intensity modulation element that generates a projection image by modulating intensity of illumination light from the lighting system, in which
the lighting system includes
a light source, and
a light phase modulation element that has a plurality of pixels with a pixel structure suppressing occurrence of high-order diffraction light and that modulates a phase of light from the light source with respect to each of the pixels.

(14)

A projector including;
a lighting system; and
a light intensity modulation element that generates a projection image by modulating intensity of illumination light from the lighting system, in which
the lighting system includes
a light source,
a light phase modulation element that has a plurality of pixels and that, modulates a phase of light from the light source with respect to each oldie pixels, and
a capturing optical system that captures a plurality of fluxes of high-order diffraction light generated in each of the pixels.

This application claims the benefit of Japanese Priority Patent Application JP 2017-152623 filed with the Japanese Patent Office on Aug. 7, 2017, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A phase modulator, comprising:
a light phase modulation element that has a plurality of pixels with a pixel structure suppressing occurrence of high-order diffraction light and that modulates a phase of light with respect to each of the pixels,
wherein the plurality of pixels is arranged in a first direction and a second direction in a matrix, and
wherein the plurality of pixels is arranged in an aperiodic manner within the matrix having at least two different pixel groove pitches.

2. The phase modulator according to claim 1, wherein the at least two different pixel groove pitches are in at least one of the first direction or the second direction.

3. The phase modulator according to claim 1, wherein the plurality of pixels is arranged to change a center of gravity of the pixel or the center of gravity of a pixel groove between two adjacent pixels in at least one of the first direction or the second direction.

4. The phase modulator according to claim 1, wherein each of the pixels includes a pixel electrode and a contact hole coupled to the pixel electrode, and wherein the pixel electrode and the contact hole have a substantially same arrangement period in at least one of the first direction or the second direction.

5. The phase modulator according to claim 1, wherein each of the pixels includes a pixel electrode and a contact hole coupled to the pixel electrode, and wherein the contact hole is arranged in a aperiodic manner within the pixel electrode in at least one of the first direction or the second direction.

6. The phase modulator according to claim 1, wherein each of the pixels includes a pixel electrode and a base pixel electrode disposed below the pixel electrode, and wherein the pixel electrode and the base pixel electrode have a substantially same arrangement period in at least one of the first direction or the second direction.

7. A phase modulator, comprising:
a light phase modulation element that has a plurality of pixels and that modulates a phase of light with respect to each of the pixels,
wherein the plurality of pixels is arranged in a first direction and a second direction in a matrix, and
wherein the plurality of pixels is arranged in an aperiodic manner within the matrix having at least two different pixel groove pitches; and
a capturing optical system that captures a plurality of fluxes of high-order diffraction light generated in the each of the pixels.

8. The phase modulator according to claim 7, wherein the capturing optical system includes:
a mirror that reflects the plurality of fluxes of high-order diffraction light emitted from the light phase modulation element; and
a lens array that captures the plurality of fluxes of high-order diffraction light reflected by the mirror.

9. The phase modulator according to claim 7, wherein the capturing optical system includes:
a plurality of optical path length correction members that correct a respective optical path length of the plurality of fluxes of high-order diffraction light emitted by the light phase modulation element; and
a lens array.

10. The phase modulator according to claim 7, wherein the capturing optical system includes:
- a lens array that captures the plurality of fluxes of high-order diffraction light emitted from the light phase modulation element; and
- a condenser lens that configures a portion of a telecentric optical system.

11. A lighting system, comprising:
- a light source; and
- a light phase modulation element that has a plurality of pixels with a pixel structure suppressing occurrence of high-order diffraction light and that modulates a phase of light from the light source with respect to each of the pixels,
- wherein the plurality of pixels is arranged in a first direction and a second direction in a matrix and
- wherein the plurality of pixels is arranged in an aperiodic manner within the matrix having at least two different pixel groove pitches.

12. A lighting system, comprising:
- a light source;
- a light phase modulation element that has a plurality of pixels and that modulates a phase of light from the light source with respect to each of the pixels,
- wherein the plurality of pixels is arranged in a first direction and a second direction in a matrix, and
- wherein the plurality of pixels is arranged in an aperiodic manner within the matrix having at least two different pixel groove pitches; and
- a capturing optical system that captures a plurality of fluxes of high-order diffraction light generated in each of the pixels.

13. A projector, comprising:
- a lighting system; and
- a light intensity modulation element that generates a projection image by modulating intensity of illumination light from the lighting system,
- wherein the lighting system includes:
  - a light source; and
  - a light phase modulation element that has a plurality of pixels with a pixel structure suppressing occurrence of high-order diffraction light and that modulates a phase of light from the light source with respect to each of the pixels,
  - wherein the plurality of pixels is arranged in a first direction and a second direction in a matrix, and
  - wherein the plurality of pixels is arranged in an aperiodic manner within the matrix having at least two different pixel groove pitches.

14. A projector, comprising:
- a lighting system; and
- a light intensity modulation element that generates a projection image by modulating intensity of illumination light from the lighting system,
- wherein the lighting system includes:
  - a light source;
  - a light phase modulation element that has a plurality of pixels and that modulates a phase of light from the light source with respect to each of the pixels,
  - wherein the plurality of pixels is arranged in a first direction and a second direction in a matrix, and
  - wherein the plurality of pixels is arranged in an aperiodic manner within the matrix having at least two different pixel groove pitches; and
  - a capturing optical system that captures a plurality of fluxes of high-order diffraction light generated in each of the pixels.

15. The phase modulator according to claim 7, wherein the at least two different pixel groove pitches are in at least one of the first direction or the second direction.

16. The phase modulator according to claim 7, wherein the plurality of pixels is arranged to change a center of gravity of the pixel or the center of gravity of a pixel groove between two adjacent pixels in at least one of the first direction or the second direction.

17. The lighting system according to claim 11, wherein the at least two different pixel groove pitches are in at least one of the first direction or the second direction.

18. The lighting system according to claim 12, wherein the at least two different pixel groove pitches are in at least one of the first direction or the second direction.

19. The projector according to claim 13, wherein the at least two different pixel groove pitches are in at least one of the first direction or the second direction.

20. The projector according to claim 14, wherein the at least two different pixel groove pitches are in at least one of the first direction or the second direction.

* * * * *